(12) United States Patent
Santilli

(10) Patent No.: US 6,673,322 B2
(45) Date of Patent: *Jan. 6, 2004

(54) APPARATUS FOR MAKING A NOVEL, HIGHLY EFFICIENT, NONPOLLUTANT, OXYGEN RICH AND COST COMPETITIVE COMBUSTIBLE GAS AND ASSOCIATED METHOD

(75) Inventor: Rugerro Maria Santilli, Palm Harbor, FL (US)

(73) Assignee: Hadronic Press, Inc., Palm Harbor, FL (US)

( * ) Notice: Subject to any disclaimer, the term of this patent is extended or adjusted under 35 U.S.C. 154(b) by 222 days.

This patent is subject to a terminal disclaimer.

(21) Appl. No.: 09/896,422

(22) Filed: Jun. 29, 2001

(65) Prior Publication Data

US 2002/0004022 A1 Jan. 10, 2002

Related U.S. Application Data

(63) Continuation-in-part of application No. 09/372,278, filed on Aug. 11, 1999, now abandoned.

(51) Int. Cl.$^7$ ................................................. B01J 19/08
(52) U.S. Cl. ............................ 422/186.21; 422/186.22; 422/186.23; 422/186.26; 422/186.27; 204/164; 204/165; 204/168; 44/628
(58) Field of Search ....................... 422/186.21, 186.22, 422/186.23, 186.26, 186.27; 204/164, 165, 168; 44/628

(56) References Cited

U.S. PATENT DOCUMENTS 603,058 A  4/1898  Elderidge et al.

3,992,277 A  * 11/1976  Trieschmann et al. ...... 204/172

(List continued on next page.)

OTHER PUBLICATIONS

Hadronic Journal vol. 1, pp. 574–901 (1978).
Elements of Hadronic Mech., vol. I, II (1995).
Foundation Physics vol. 27, pp. 625–729 (1997).
International Journal of Quantum Chemistry, Quantum Chemistry Symposium 29, p. 175–187 (1995).
Hadronic Journal Vo. 21, Special Issue 6, Dec. 1998.
Ralph H. Petrucci: General Principles and Modern Applications, 3rd ed, pp. 537–544 (date unknown).
Masteron & Slowinski: Chemical Principles, 2nd ed. p. 87 (date unknown).

*Primary Examiner*—Alan Diamond
(74) *Attorney, Agent, or Firm*—Dennis G. LaPointe; Mason Law, P.A.

(57) ABSTRACT

A process for the production of a clean burning combustible gas by flowing a liquid through an electric arc. The electrodes have several configurations. The invention prevents the production of carbon dioxide in the gas thereby reducing its presence when combusted and exhausted to about half that associated with gasoline exhaust; increases the cost efficiency of the process by eliminating secondary chemical reactions; and increases the life of the electrodes. The chemical structure of the combustible gas is composed of stable magnetically bonded clusters of conventional molecules and atoms that are fully detectable via peaks in conventional mass spectrometric detectors, yet such clusters remain unidentifiable by the computer search among all known molecules, and have no infrared signature other than those of the conventional molecules constituting the clusters. The liquid which is flown through the arc also acquires the chemical structure of magnetically bonded clusters.

68 Claims, 26 Drawing Sheets

U.S. PATENT DOCUMENTS

| | | | |
|---|---|---|---|
| 4,054,513 A | | 10/1977 | Windle |
| 4,338,509 A | | 7/1982 | Bartuska et al. |
| 4,957,606 A | | 9/1990 | Juvan |
| 5,026,484 A | * | 6/1991 | Juvan ................... 210/717 |
| 5,069,765 A | * | 12/1991 | Lewis ................... 204/173 |
| 5,159,900 A | | 11/1992 | Dammann |
| 5,417,817 A | | 5/1995 | Dammann et al. |
| 5,435,274 A | | 7/1995 | Richardson, Jr. |
| 5,482,601 A | | 1/1996 | Ohshima et al. |
| 5,587,141 A | | 12/1996 | Ohshima et al. |
| 5,692,459 A | | 12/1997 | Richardson, Jr. |
| 5,792,325 A | | 8/1998 | Richardson, Jr. |
| 5,826,548 A | | 10/1998 | Richardson, Jr. |
| 6,113,748 A | * | 9/2000 | Richardson, Jr. ........... 204/170 |
| 6,183,604 B1 | * | 2/2001 | Santilli ................... 204/172 |
| 6,299,656 B1 | * | 10/2001 | Richardson, Jr. et al. ..... 44/603 |
| 6,540,966 B1 | * | 4/2003 | Santilli ................... 422/186.21 |
| 2002/0004022 A1 | * | 1/2002 | Santilli ................... 422/186.04 |
| 2003/0051991 A1 | * | 3/2003 | Santilli ................... 204/164 |
| 2003/0051992 A1 | * | 3/2003 | Rappa et al. ................ 204/164 |
| 2003/0106787 A1 | * | 6/2003 | Santilli ................... 204/164 |
| 2003/0113597 A1 | * | 6/2003 | Santilli ................... 429/17 |

* cited by examiner

APPARATUS FOR MAKING A NOVEL, HIGHLY EFFICIENT, NONPOLLUTANT, OXYGEN RICH AND COST COMPETITIVE COMBUSTIBLE GAS AND ASSOCIATED METHOD

RELATED APPLICATION

This application is a continuation-in-part of related U.S. patent application Ser. No. 09/372,278 filed Aug. 11, 1999 now abandoned.

BACKGROUND OF THE INVENTION

1. Field of the invention

The present invention relates to a novel, highly efficient, nonpollutant, oxygen rich and cost competitive gas and associated method of making same.

2. Description of the related art.

The ability to produce a combustible gas from underwater arcs between carbon electrodes was discovered and patented in the 19th century. Subsequently, various patents have been obtained in the 20th century based on improvements of this process.

As is shown in the art discussed above, the arc is generally produced between two carbon rods immersed in water via a DC power unit, such as a welder absorbing 15 KW of electric power, with the arc operating at low voltage (25–35 V) and high current (300 A to 400 A). Proportionately larger values of arc voltage and current are produced by larger power units. The high value of the current brings to incandescence the tip of the carbon cathode, with a consequential disintegration of the carbon crystal, and a release of highly ionized carbon atoms to the liquid. Jointly, the arc separates the water into mostly ionized atoms of hydrogen and oxygen. This creates in the immediate cylindrical surroundings of the arc a high temperature plasma, generally of about 7,000 degrees F, which is composed of mostly ionized H, O, C and other atoms.

A number of chemical reactions then occur within or near the plasma, including but not limited to, the creation of carbon monoxide and its subsequent oxidation into carbon dioxide due to the presence of the arc within a mixture of oxygen and carbon monoxide and the creation of water molecules due to the presence of the arc within a mixture of hydrogen and oxygen.

Despite research and developments conducted by numerous scientists for decades, the technology of combustible gas produced by an underwater arc between carbon electrodes has not reached industrial or consumer maturity. In addition, no equipment for producing said combustible gas for actual usages is currently sold to the public in the U.S.A. or abroad. In fact, the only equipment available is that equipment for research on or for the generation of different types of gases (for instance, gases with implosive characteristics, such as the so-called Brown Gas) that are not useful in internal combustion engines.

These prior art gasses and underwater arcs have a number of shortcomings. Specifically, various measurements conducted at independent laboratories have established that the gas produced by a typical underwater arc generally contains 9%–10% of carbon dioxide, which increases to about 18% in the combustion exhausts.

By comparison, gasoline combustion exhausts contain only about 9% carbon dioxide, while the combustion exhausts of natural gas have about 12% carbon dioxide for the same performance or engine power. Therefore, the gas produced in accordance with the prior art emits in its combustion about two (2) times the carbon dioxide present in the gasoline combustion exhaust. This particularly problematic carbon dioxide is the primary source of the green house effect in our planet. It is evident that the carbon dioxide emission of the combustible gas produced according to the prior art is unacceptable for regular industrial and consumer production and sale.

Further, as established by certified measurements, a known underwater arc with a 13 Kwh power unit produces 24.5 cubic feet of gas per hour with the arc operating in DC mode at 34 V and 230 A. These known underwater arcs yield an excessively low efficiency E=24.5 cfh/13 Kwh=1.86 cf/Kwh. In addition, the carbon rods of these prior art devices have an excessively short life span. Specifically, certified measurements indicate that for power units of about 14 Kwh, the electrodes are typically composed of solid carbon rods of about ⅜ inch in diameter and about 1 foot length. These rods are consumed at the rate of about 1.250 inch in length per minute, thus requiring the halting of the operation, and the replacement of the electrodes approximately every 10 minutes.

The same tests have also shown that, for 100 Kwh power input, said electrodes are generally constituted by solid carbon rods of about 1 inch diameter and of the approximate length of one foot, which are consumed under a continuous underwater arc at the rate of about 3 inches in length per minute, thus requiring servicing and replacement after about 3 to 4 minutes of operation.

In either case, 14 Kwh or 100 Kwh, current equipment requires servicing after only a few minutes of usage, which is unacceptable on industrial and consumer grounds for evident reasons, including increased risks of accidents for very frequent manual operations in a high current equipment.

In view of the prior art considered as a whole at the time the present invention was made, it was not obvious to those of ordinary skill in the pertinent art how these problems could be overcome.

SUMMARY OF THE INVENTION

The long-standing but heretofore need for an improved, highly efficient, nonpollutant, oxygen rich, cost competitive, combustible gas and an associated method of making same is now met by the present invention.

Regarding the various configurations and features of the arc, which forms a portion of the invention described herein below, it should be noted that in another application by the inventor herein, namely application Ser. No. 09/372,277, filed Aug. 11, 1999, now U.S. Pat. No. 6,183,604 B1, issued Feb. 6, 2001, the anode electrode was made to continuously rotate so that the arc moved away from the plasma created by the arc. In the present invention, the liquid is force flown or directed toward and through the arc, while the electrodes may or may not be stationary, to cause the created plasma to move away from the arc. So in a sense, the above mentioned patent and the present invention described herein below complement each other.

The invention is an apparatus for the production of a clean burning combustible gas. It includes an enclosed pressure resistant reactor chamber housing a pair of electrodes. The chamber is substantially filled with a liquid. An electric power supply for generating an underliquid arc between the pair of electrodes in the enclosed chamber is provided.

Of importance is the feature of means for recirculating and directing a flow of the liquid through the arc between the pair of electrodes so that a plasma created by the arc is moved away from the arc.

Means for recovering from the enclosed chamber a combustible magnegas produced by said underliquid arc is provided in the form of an outflow line in communication with a storage/collecting container or tank.

Both the gas and the liquid acquire a chemical structure of magnecules, which are composed of clusters of one of a molecule, a dimer, an atom and combinations thereof in combination with one of another molecule, dimer or atom, and any combination thereof, said magnecules being detectable via peaks in mass spectrometry. The peaks in the mass spectrometry are unidentifiable as any known conventional molecule and the magnecules have no infrared signature for a gas or ultraviolet signature for a liquid other than a corresponding signature of conventional molecules or dimers constituting said magnecules.

The magnecules are formed by mutual attractions among opposite polarities of a magnetic polarization of orbits of peripheral electrons and a polarization of the intrinsic magnetic moments of nuclei and electrons of the atomic constituents of said magnecules when exposed to an extreme magnetic field existing at atomic distances from the arc.

The arc decomposes the liquid into its atomic constituents by forming the plasma, which is composed of mostly ionized atoms of hydrogen, oxygen, and carbon.

The plasma cools down in the surrounding liquid resulting in the clean burning combustible gas that is essentially composed of one of atoms of hydrogen, oxygen and carbon, dimers of carbon dioxide and water, and molecules of hydrogen, oxygen, carbon monoxide, carbon dioxide, and water, and any combinations thereof, clustered into said magnecules.

When the produced and collected gas is burned, a combustion exhaust of the gas with said magnecular structure is rich in oxygen originating from said liquid, rather than from atmospheric oxygen. This oxygen is suitable to replenish atmospheric oxygen. The gas also has an energy density and output greater than those of the corresponding gas with conventional molecular structure.

The flow of the liquid through the arc further minimizes the oxidation of carbon monoxide into carbon dioxide caused by the arc itself with a consequential increase of efficiency of the apparatus and an improved environmental properties of the magnegas.

The flow of the liquid through the arc cools the electrodes with a consequential increase of their life.

The chemical structure of magnecules in the liquid increases the carbon content of the liquid itself as further described in detail below. The apparatus is efficient even where the electrodes are nonconsumable, since the carbon needed to create said combustible gas is contained in the clustering of said liquid and the carbon into magnecules.

Electromechanical means controlling the gap between said electrodes for the initiation, maintenance and optimization of the arc are also provided. Such means further provide for increasing an arc gap whenever the one of the arc voltage, the arc current and a combination thereof increases, and for decreasing the arc gap whenever the one of the arc voltage, the arc current and a combination thereof decreases. In addition, such means produce a relative rotation of one electrode with respect to the other electrode.

The power supply produces a continuous DC current or an alternating AC current. The electrodes are composed of a negatively charged anode and a positively charged cathode supported in said enclosed chamber and positioned in such a manner to create a gap between said anode and said cathode.

In one embodiment, the electric arc occurs between an electrode composed of a non-consuming tungsten material, and another electrode composed of a consumable carbon base material. In other embodiments, the electric arc occurs between electrodes composed of a consumable carbon base material, or between rod shaped electrodes.

Other embodiments provide for electrodes, wherein the electrodes are composed of one of a rod shaped electrode and one of a cylindrically shaped hollow electrode in relative rotational motion one with respect to the other, or wherein the electrodes have a hollow cylindrical shape and are in relative rotation headwise one with respect to the other.

A pump is provided as part of the means for recirculating the liquid.

In one embodiment, the liquid is flown through the arc in a direction perpendicular to the direction of the arc itself. In other embodiments, the liquid is flown through the arc in a direction parallel to the direction of the arc itself, or the liquid is flown through the arc by passing inside a cylindrically shaped hollow electrode.

It is preferred that at least one of the pair of electrodes be stackable and include means for the reloading of the at least one of the pair of electrodes to provide for the continuous use of the apparatus.

The liquid which may be processed with the apparatus may be antifreeze, oil, including waste oil and crude oil, one of liquid waste, including household, industrial, agricultural, and municipal liquid waste and any of their combinations, sea water, and one of household, municipal, industrial liquid sewage and any combination thereof.

The apparatus further includes means forte removal of liquid sewage from the reactor chamber following its passage through the arc. The flow of sewage through the arc causes the elimination of bacteriological forms in the liquid sewage itself. Means for degaussing (removal of the electric and magnetic polarization) the liquid sewage after the liquid sewage is flown through the arc is further provided as part of the fluid output assembly. A centrifuge for removing solids in suspension in the liquid sewage which has been flown through the arc is located downstream of the means for degaussing. The collected solids are suitable for use as fertilizers. The assembly further includes a removable container which receives the solids collected by the centrifuge without interruption of the operation.

The assembly further includes a filtering means, which is located downstream of the means for degaussing and the centrifuge, the filtering means producing water suitable for irrigation.

The means for recirculating the liquid preferably includes a magnetic polarization unit for magnetically polarizing the liquid as it recirculates.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

This invention is the result of systematic basic research conducted by this inventor at the particle, atomic and molecular levels, combined with systematic experiments and measurements.

The part of these studies relevant for this invention is a new model of molecular structure published in Oxford, England by R. M. Santilli and D. D. Shillady in two papers entitled "A new isochemical model of the hydrogen molecule", International Journal of Hydrogen Energy Vol. 24, pages 943–956, 1999, and "A new isochemical model of the water molecule", International Journal of Hydrogen Energy Vol. 25, pages 173–183, 2000, whose content is herewith assumed to avoid unnecessary repetition.

Figure 1:
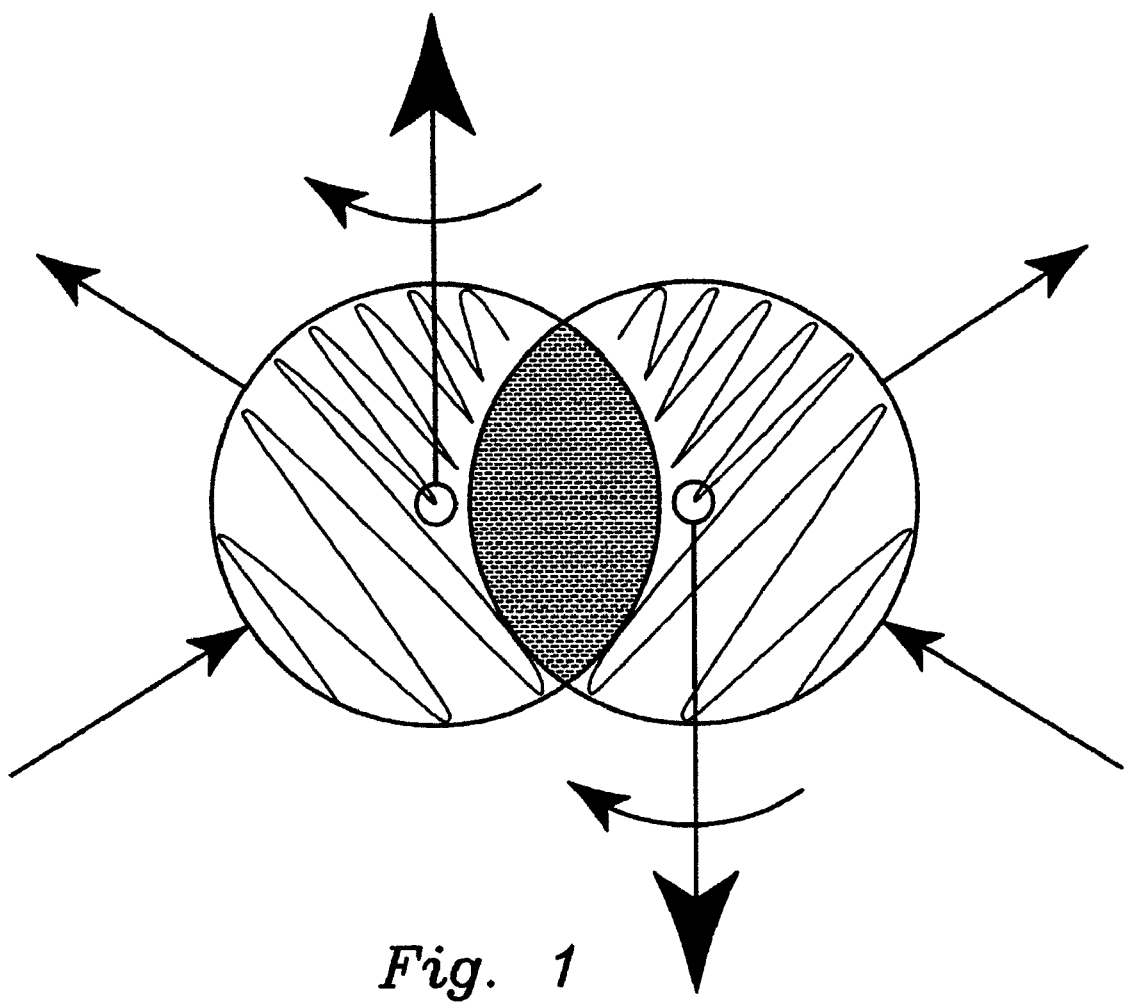
FIG. 1 depicts a pair of valence electrons as occurring in the hydrogen molecule in conditions of deep overlapping of their energy packets.
Figure 2:
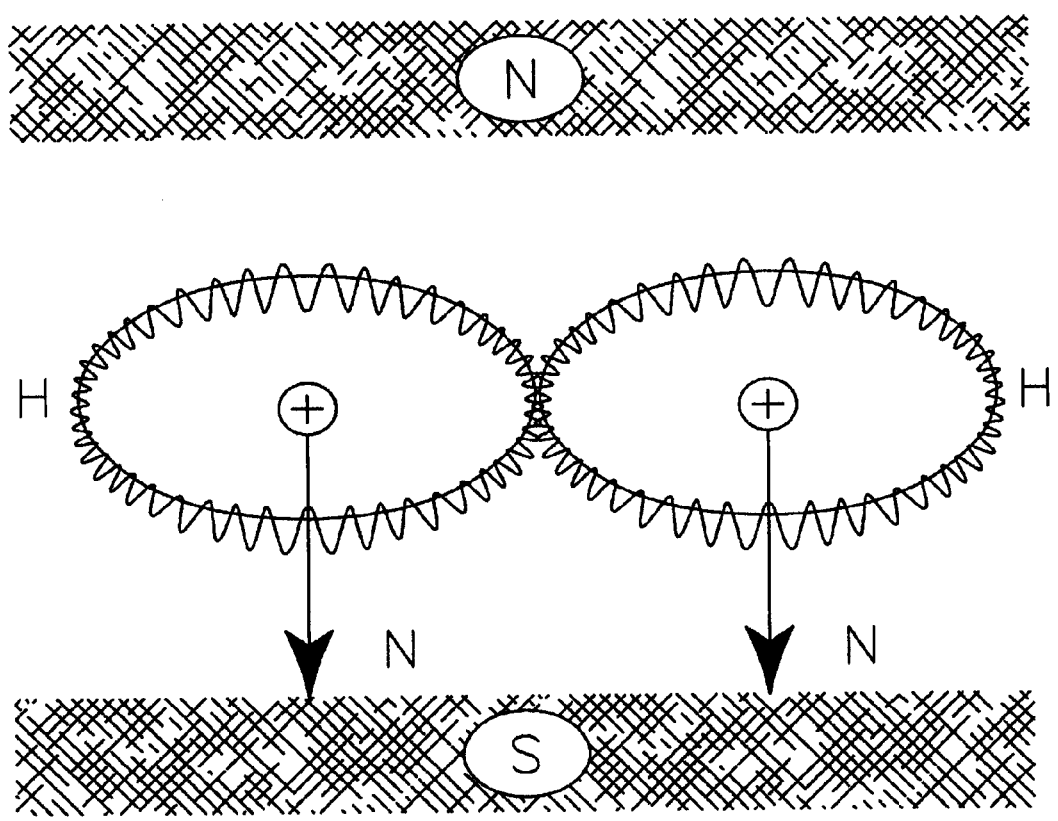
FIG. 2 depicts the new model of hydrogen molecule at the foundation on this invention, which model is based on a strong correlation bond of the two valence electrons with anti-parallel spin (to verify Pauli's exclusion principle) into a quasi-article as in FIG. 1 with charge −2e, spin 0, and magnetic moment 0, which quasi-particle describes an o-shaped orbit around the respective two nuclei.

This model essentially consists in the assumption that the two valence electrons of the hydrogen atom have a strong bond-correlation in singlet couplings as in FIG. 1 with anti-parallel spin (to verify Pauli's exclusion principle) into a quasi-particle state with charge −2e, spin 0, and magnetic moment 0, which quasi-particle describes an o-shaped orbit around the respective two nuclei much similar to the orbit of a planet in certain binary stars systems, as depicted in FIG. 2.

The new model of molecular structure permits the following scientific advances, among others:

1) The new model of molecular structures permits a representation of the binding energy, electric and magnetic moments and other features exact to the seventh digit, while conventional molecular models still miss about 2% of these data, while having even the wrong sign of the dipole moments.

2) The new model permits the first explanation of the reason why the hydrogen and water molecule only admit two hydrogen atom. By comparison, conventional model admit an arbitrary number of hydrogen atoms in the same molecules since the correlation-bond of the valence electrons is not strictly restricted to two in the latter model.

Figure 3:
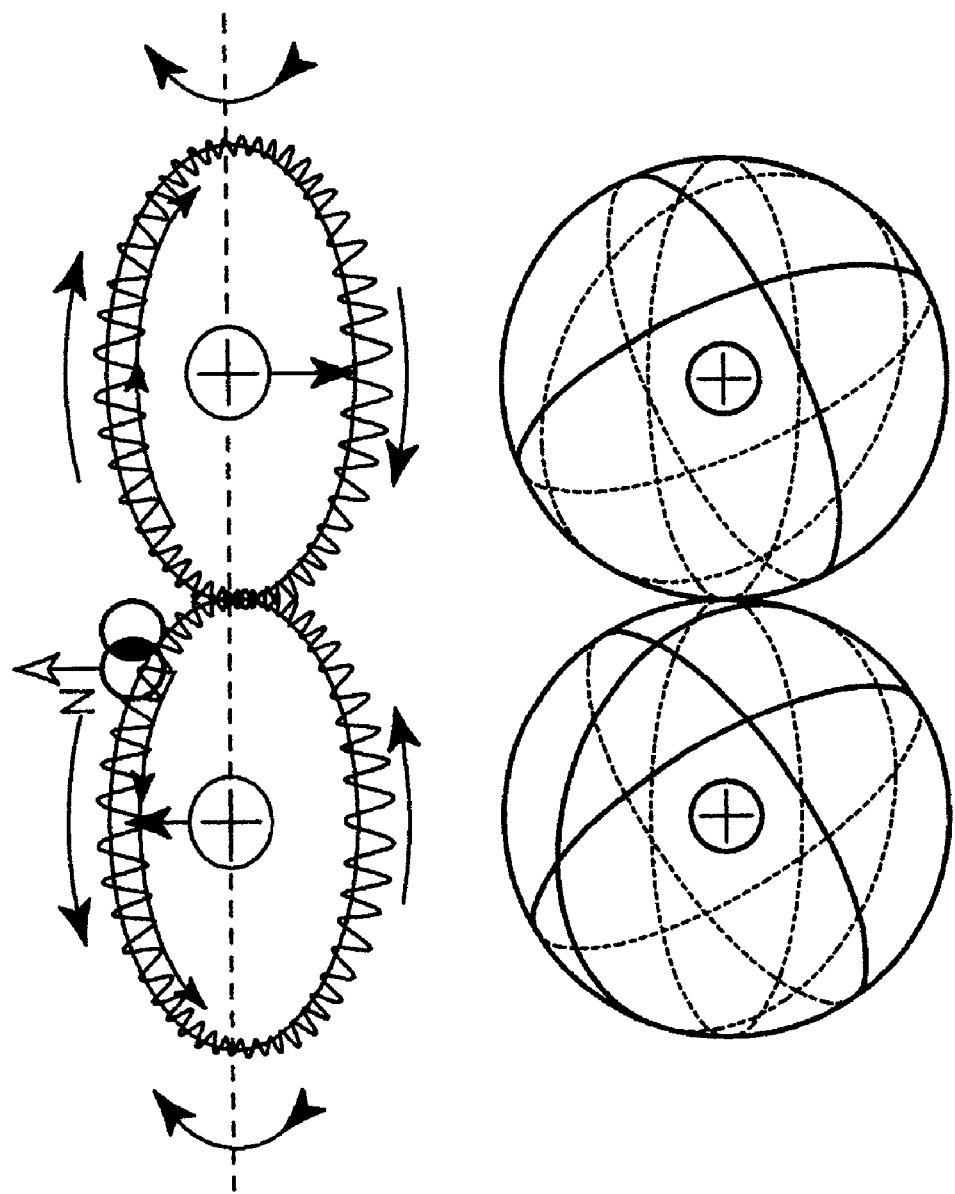
FIG. 3 depicts the correct interpretation of the diamagnetic character of the hydrogen molecule according to the model of FIG. 2 because the opposite character of the rotations of the individual o-branches of the orbit.
Figure 4:
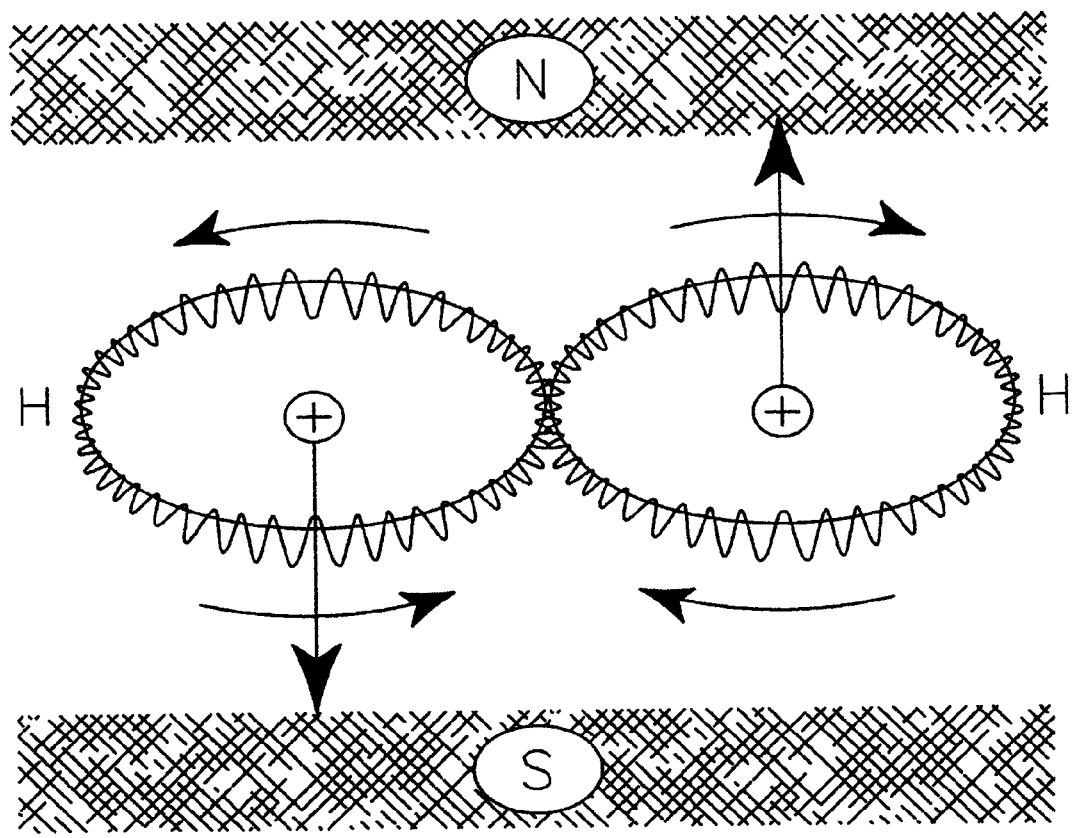
FIG. 4 illustrates the fact that the hydrogen molecule can acquire a total net magnetic polarity whenever its two atoms are assumed to be independent, which total polarity is in contradiction with natural characteristics because the hydrogen molecule is diamagnetic.

3) The new model permit the correct interpretation of the diamagnetic character of the hydrogen molecule as depicted in FIG. 3, due to the fact that the rotations of the two o-branches of the orbit of FIG. 2 are opposite to each others, thus resulting in opposite magnetic polarization of the two atoms with essentially null total magnetic moment. By comparison, conventional molecular models do predict a total net magnetic polarity for the hydrogen molecule in disagreement with evidence whenever the realization of the valence bond permits the independence of the individual hydrogen atoms as depicted in FIG. 4.

Figure 5:
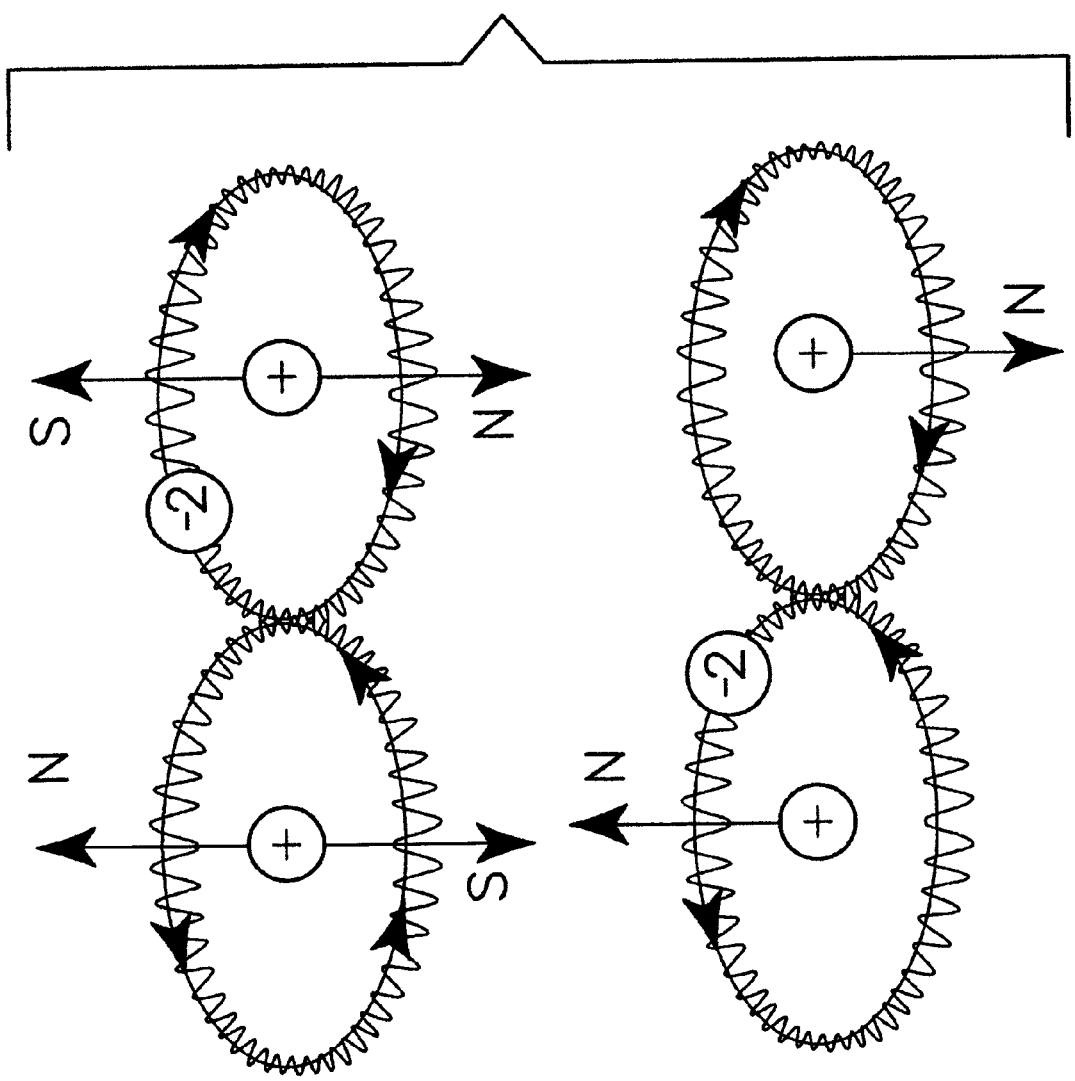
FIG. 5 depicts the bonding of two hydrogen molecules into a new cluster, called magnecule, created by the attraction of opposing polarities of the polarization of the peripheral electrons.

More recent theoretical and experimental studies have identified the existence of a novel chemical species, called "magnecules" in order to distinguish them from conventional "molecules" as well as to denote the origin of their bond. As one can see, magnecules essentially consists of stable clusters of atoms (such as H, C and O), dimers (such as OH) and molecules (such as CO) under a new magnetic bond between opposite polarities of the magnetic polarization of the orbit of the valence electrons into a plane, as schematically represented in FIG. 5 for the magnetic bond of two hydrogen molecules.

In fact, when the orbit of peripheral atomic electrons are transformed from a spherical to a planar distribution because of a sufficiently strong external magnetic field, there is the emergence of a new magnetic field due to the rotation of the electron charge in said planar orbit which field results to be 14, 125 times stronger than nuclear magnetic fields, thus sufficiently strong to create new clusters.

Figure 6:
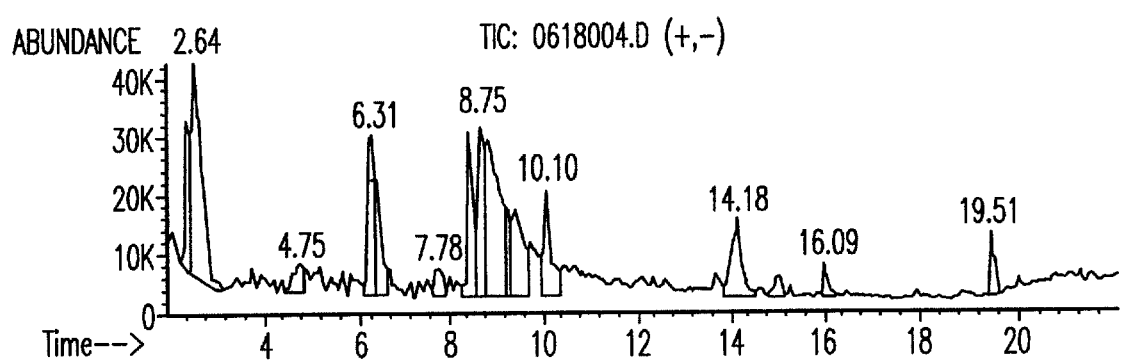
FIG. 6 depicts the experimental evidence on the existence of magnecules identified at the branch of NATIONAL TECHNICAL SYSTEMS (NTS) located at McCLELLAN Air Force Base in North Highland, Calif. for technical reasons explained in the specifications.
Figure 7:
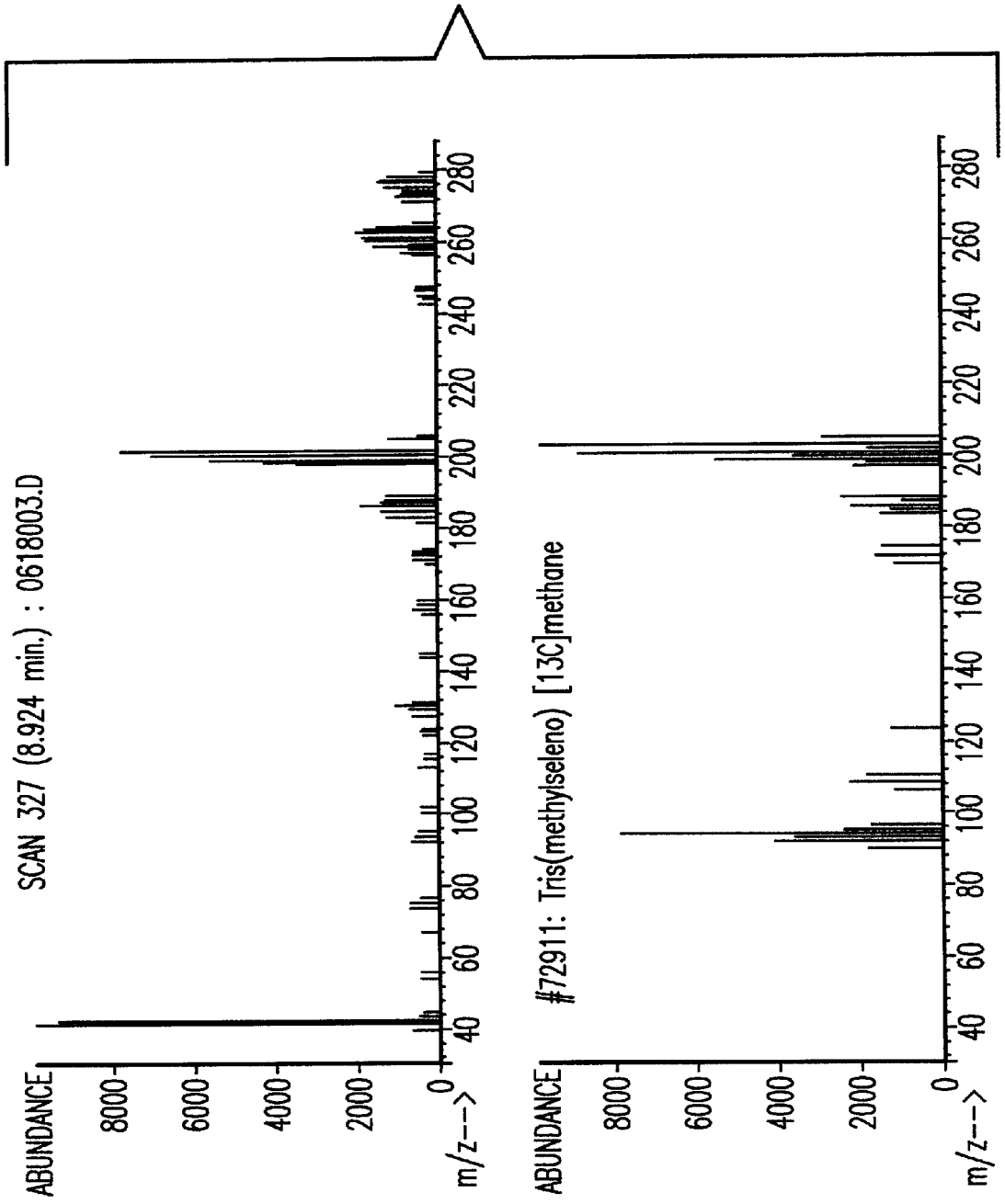
FIG. 7 provides an example of the measurements conducted at the NTS establishing that all peaks of FIG. 6 were "unknown" following a computer search among 150,000 substances at McClellan Air Force Base.
Figure 8:
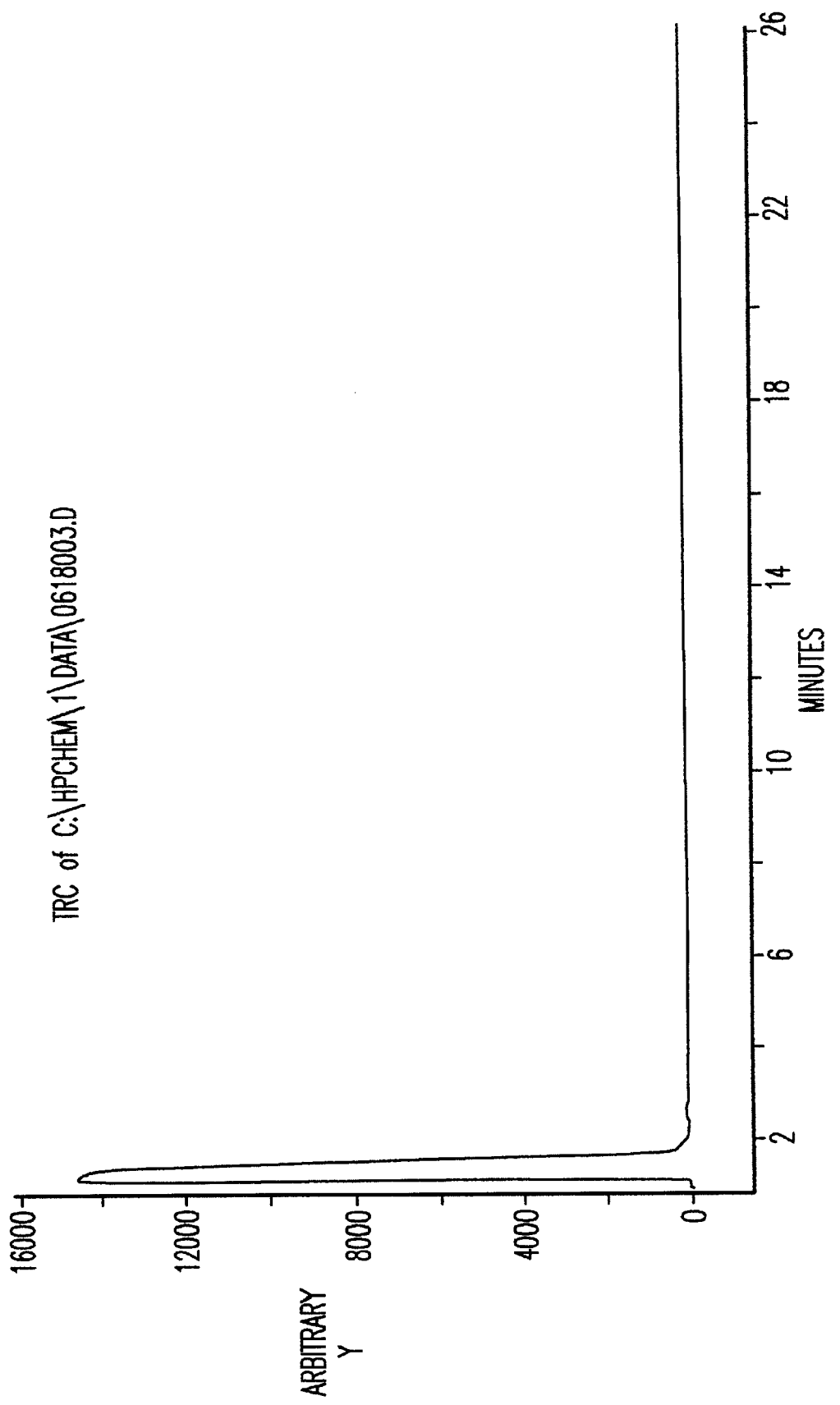
FIG. 8 depicts the experimental evidence at the NTS on the lack of infrared signature of the mass peaks of FIG. 6 establishing the lack of valence nature of the bond.
Figure 9:
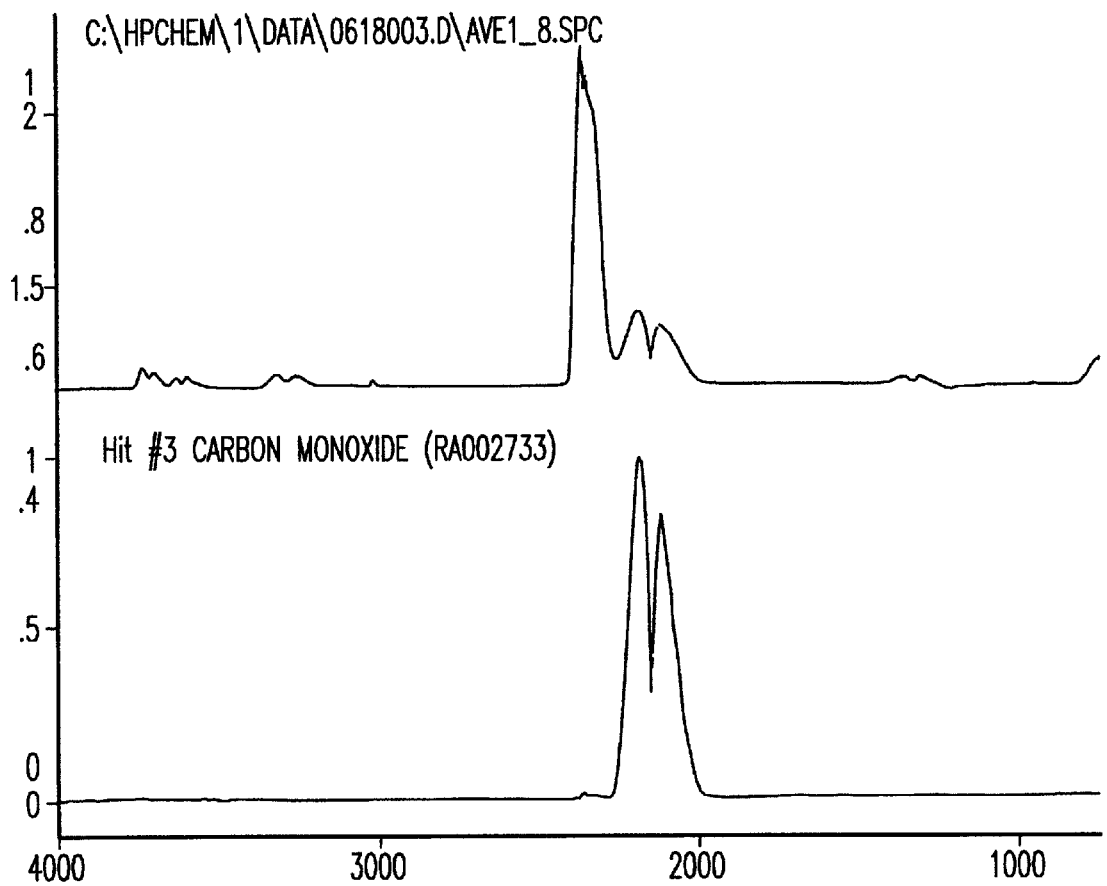
FIG. 9 depicts the experimental evidence at the NTS on the alteration of the infrared signature of magnetically polarized conventional molecule such as the carbon dioxide.
Figure 10:
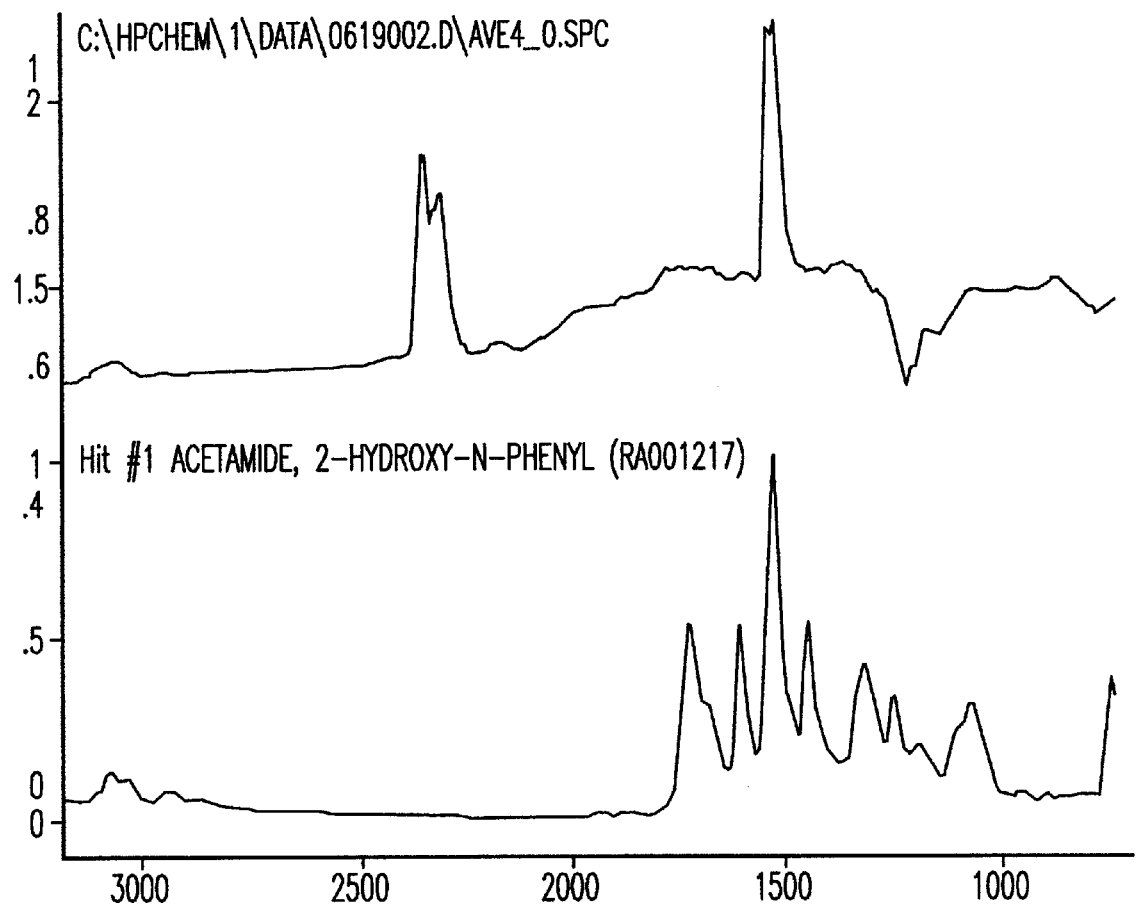
FIG. 10 depicts another lack of identification in the computer search of small peaks of the infrared scan of FIG. 7.

The main experimental evidence on the existence of the new chemical species of magnecules is presented in FIGS. 6 to 14. In summary, gas magnecules are fully detectable by peaks in Gas Chromatographic Mass Spectrometric equipment (GC-MS), as illustrated in the GC-MS scan from 40 amu to 500 amu reproduced in FIG. 6. However, none of these peaks are identifiable by computer searches among all known molecules, as illustrated in FIG. 7. Moreover, none of these peaks possess an InfraRed (IR) signature, except for those of the conventional molecules and dimers constituting said peaks, as illustrated by the IR scan of the MS peaks of FIG. 6 reproduced in FIG. 8, according to which none of the MS peaks of FIG. 6 admits an IR signature except for a conventional molecules identified by the IR but not by the MS scan which, as such, is a constituents of the MS peaks of FIG. 6. This evidence establishes that none of the MS peaks of FIG. 6 is a conventional molecules. FIG. 9 illustrates that the IR signature of conventional molecules constituting magnecules, can be "mutated", in this case, due to the appearance of two new IR peaks not existing in the conventional molecule. FIG. 10 illustrates that other very small peaks of the IR scan of FIG. 8 are not identifiable by the computer search.

Figure 11A:
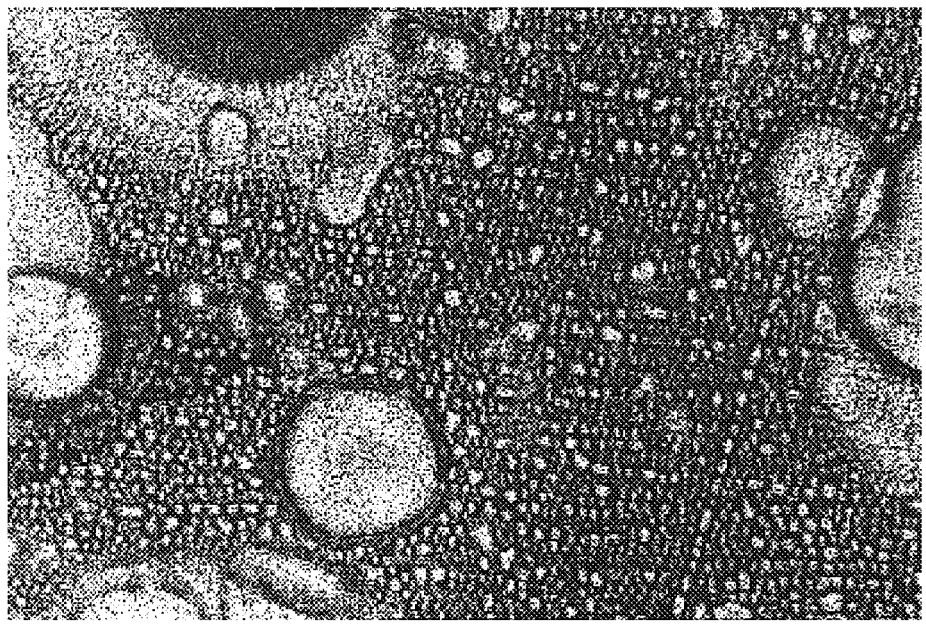
FIG. 11A is a photographic image of the otherwise transparent fragrance oil "ING258IN, Test 2" after magnetic polarization (10× magnification)
Figure 11B:
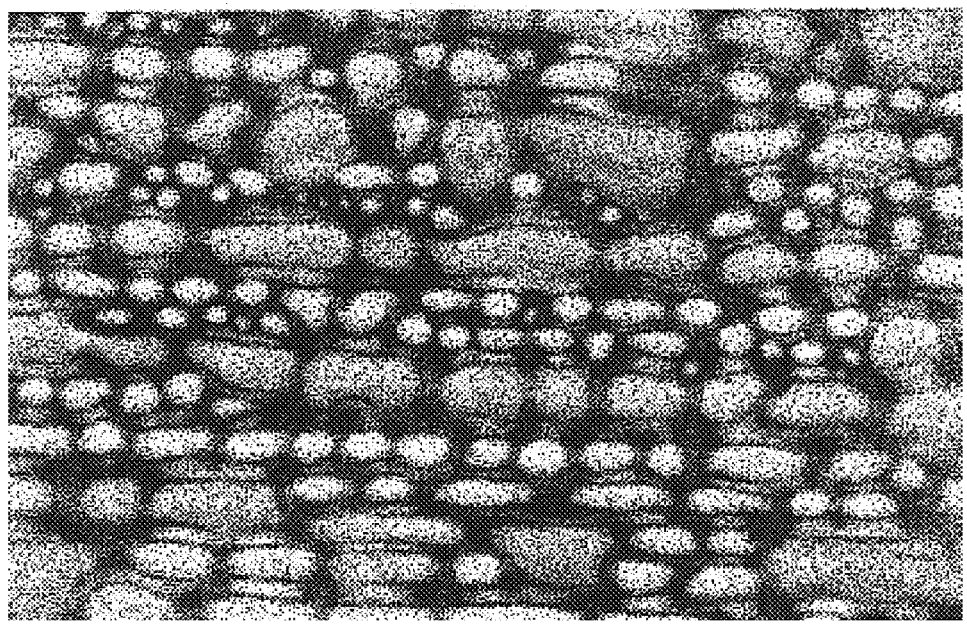
FIG. 11B is a photographic image of the otherwise transparent fragrance oil "ING258IN, Test 2" after magnetic polarization (100× magnification)
Figure 12:
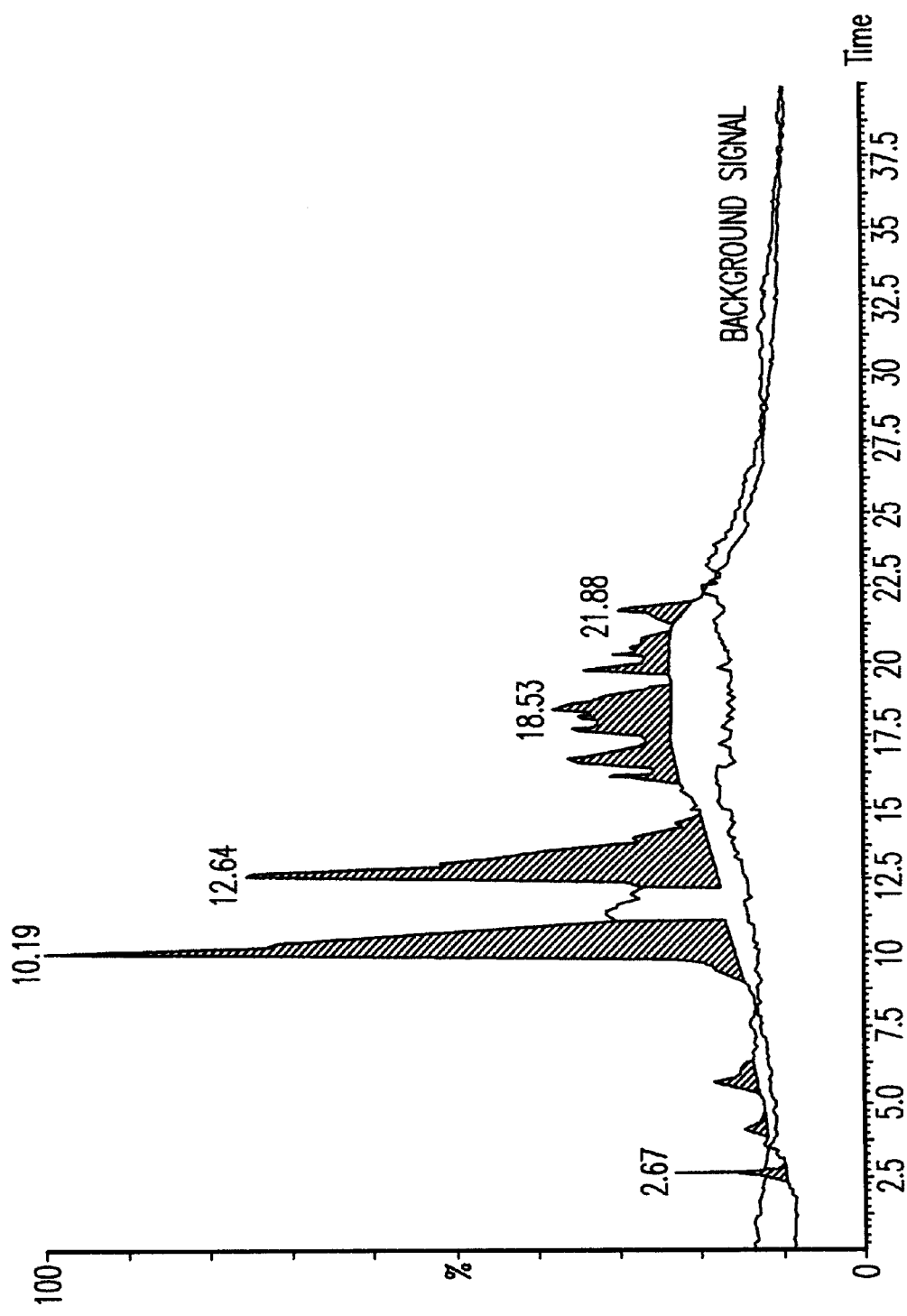
FIG. 12 depicts the scan at via liquid chromatography/mass (LC-MS) spectroscopy on the fragrance oil of FIG. 11 prior to any magnetic treatment conducted at the DEPARTMENT OF CHEMISTRY of FLORIDA INTERNATIONAL UNIVERSITY (FIU) in Miami, Fla.
Figure 13:
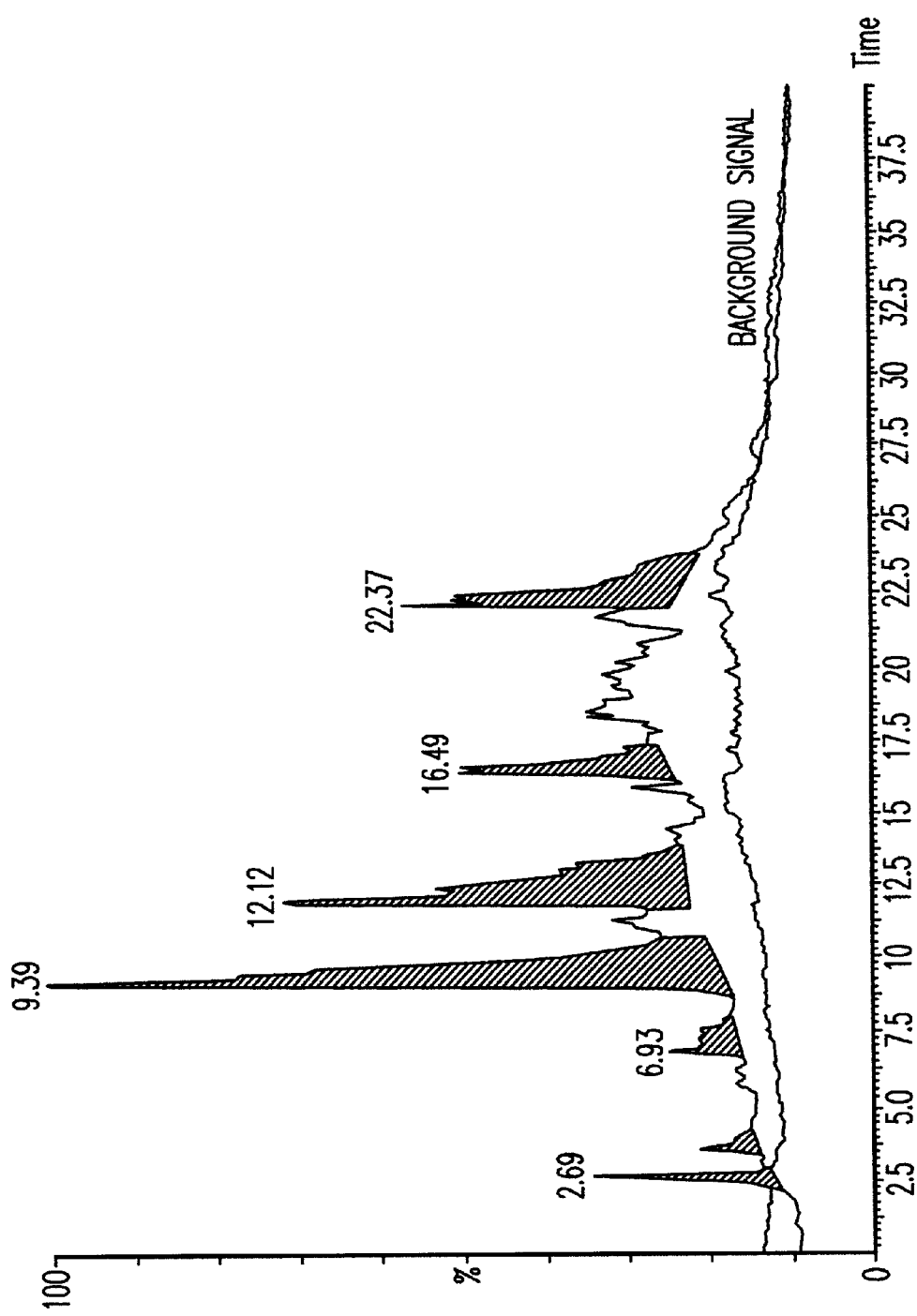
FIGS. 13 and 14 depicts the LC-MS scan of the fragrance oil following the magnetic treatment that led to the view of FIG. 11.
Figure 14:
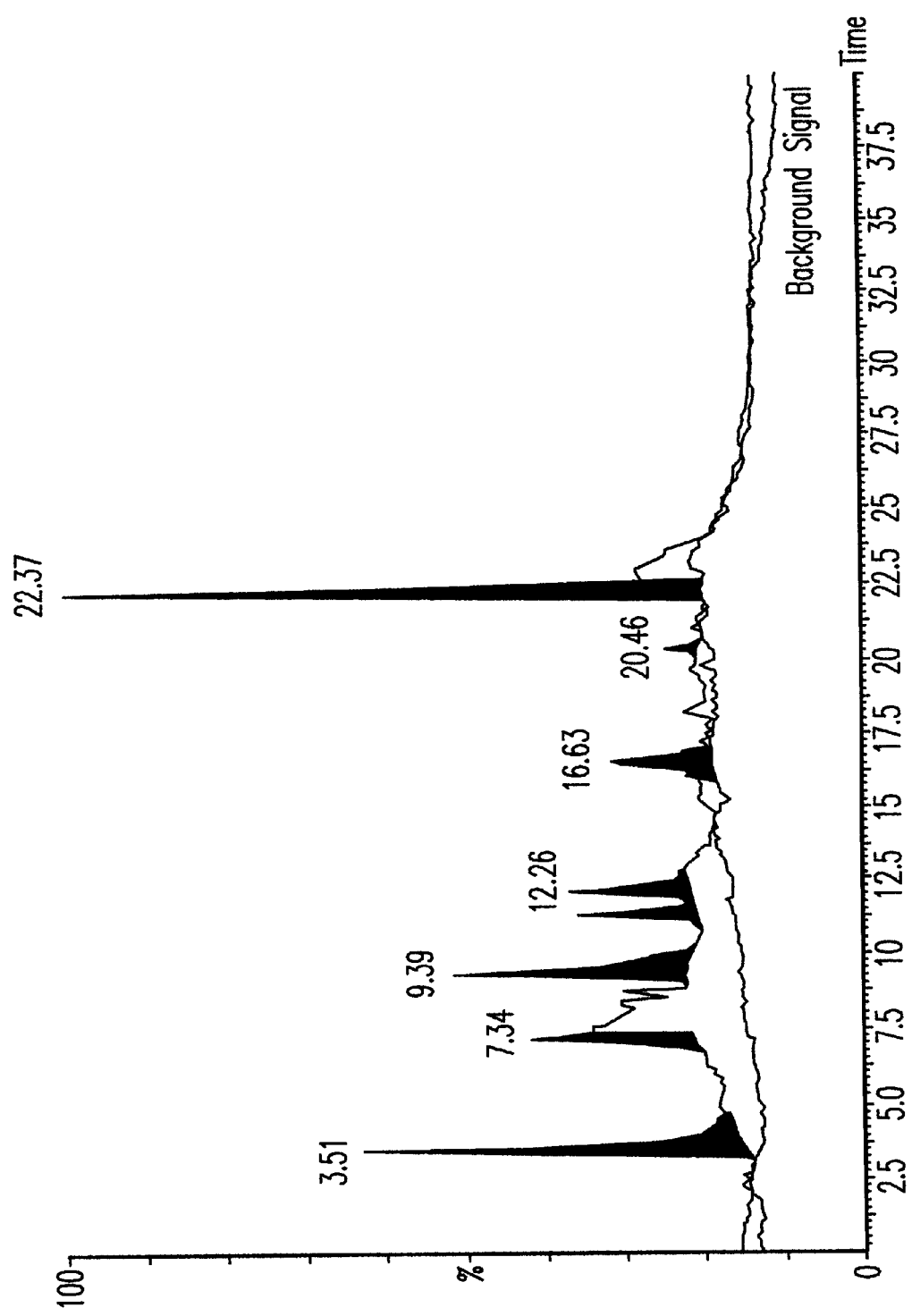

For the case of liquid magnecules, FIGS. 11A and 11B provide photographic evidence of the "brick-layered" structure of and originally transparent oil when suitably treated via magnetic fields. FIGS. 12, 13 and 14 reproduces some of the numerous scans of the same liquid of FIG. 11 before and after magnetic treatment via Liquid Chromatographic Mass Spectrometric equipment (LC-MS). These scans establish the emergence of new peaks after the magnetic treatment, which new peaks result to be unidentifiable by computer search as molecule and are absent in the original untreated substance. Since the treatment of the liquid has been purely magnetic without any physical or chemical intervention, the new peaks cannot constitute molecules. The novel chemical nature of the new peaks is then confirmed by their absence of UltraViolet (UV) signature, since the latter establishes the lack of a valence bond responsible for the new clusters.

The existence of solid magnecules has been established by freezing liquids with magnecular structure, defrosting them into the original liquid, and then confirming the preservation in the latter liquid of the original magnecular structure.

Figure 15:
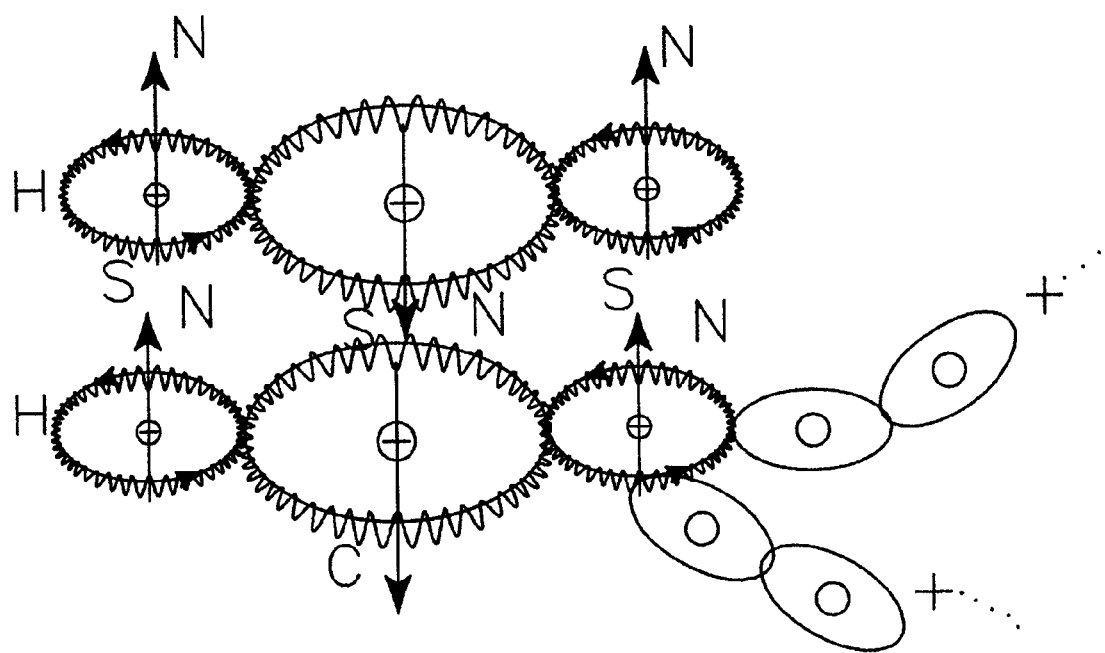
FIG. 15 depicts a representative gas or liquid magnecule of this invention consisting of the magnetic bond of only the dimers of conventional molecules, the remaining atoms being not necessarily subjected to the same magnetic bond.

FIG. 15 depicts a generic gas or liquid magnecule which is composed by two molecules magnetically bonded by two of their polarized dimers, while the rest of the molecules remain unpolarized and unbonded.

At the time of the discovery in the 19th century of the combustible character of the gas bubbling to the surface from underwater arcs among carbon electrodes, the analytic methods of the time were primitive. Therefore, the chemical composition of the gas was essentially unknown. In fact, U.S. Pat. NO. 603,058 to H. Eldridge in 1898 generically refers to a "hydrogen gas," seemingly indicating a gas primarily composed by hydrogen, a denomination which was and remains meaningful to this day.

Prior art scientists had the opportunity to identify the conventional chemical composition of said combustible gas via modern analytic equipment. For instance, the gas originating from arcs between carbon electrodes within ordinary tap water resulted to consist of about 45%–48% hydrogen, 36%–38% carbon monoxide, 9%–10 carbon dioxide, 1%–2% oxygen, plus parts per millions of various other molecules also composed by H, O, and C.

The basic theoretical and experimental research outlined in these specifications has permitted the discovery that gases produced by an electric arc under liquids are primarily composed by the new chemical species of magnecules, and are herein called "magnegases." This is explained by the fact that arcs possess in their cylindrical surroundings very strongest magnetic fields, of the order of 10 Tesla and more, evidently depending on the current. The H, O and C atoms inside the plasma surrounding the arc are therefore exposed to such a strong magnetic field.

Quantum electrodynamics then establishes that the valence and other electrons of such atoms simply cannot orbit in all directions in space, as it is the case for conventional atoms, and must orbit instead in fixed planes, thus creating magnetic moments which are 1,315 times stronger than nuclear magnetic moments, as indicated above. Still in turn, atoms and molecules possessing such strong magnetic fields attract each other, resulting in the structure of a magnegas, that is, a gas whose chemical composition is that of magnecules, as established by the several GC-MS/IRD measurement at various independent laboratories outlined earlier.

As an illustration, consider the magnegas produced by an arc between carbon electrodes within ordinary tap water. Such a gas is constituted by H, O, and C atoms and their molecules combined into generic magnecules. This results in small, intermediate and large magnecules which have been experimentally detected all the way to 700 amu, and as schematically represented in FIG. 15.

As an illustrative example, the GC-MS and IR scans of FIG. 6 to 10 were conducted precisely on the above described type of magnegas produced from tap water. Note in particular that the peaks which eluded at 8.925 minutes and reproduced in FIG. 7 is composed by various constituents possessing atomic masses ranging from 42 to 277 amu.

As previously mentioned, any peak in the IR signature represents an internal bond, the experimental detection in FIG. 9 of two new IR peaks establishes the capability of storing more energy in magnetically polarized molecules than that in the unpolarized molecule. The same result holds also for other gas molecules. The increase of energy content in magnetically polarized gases can be as high as 270% the energy content of the same gas in conventional unpolarized conditions. These measurements were conducted in magnetically polarized gases which has 870 BTU/cf while the same gas in an unpolarized condition has 315 BTU/cf.

It is evident that the increase of energy content of a combustible gas by its magnecular structure is important for this invention since it implies an increase of the efficiency as we shall see later in these specifications.

Equally important for this invention are the liquids with magnecular structure, hereon called "magneliquids." An example is given by the magnecule composed of water and carbon, or magnecules composed of water molecule and organic chains of carbon rich molecules, as schematically represented in FIG. 15. In fact, such a magnecular structure also provides for an increase of the efficiency of underliquid arcs.

It should be stressed that magnegases and magneliquids can be easily identified by existing GC-MS/IRD and LC-MS/UVD equipment, respectively, operating at ordinary temperature, e.g., at 60 degrees F, thus permitting experimental verifications of possible infringements of this invention.

A first novelty of this invention over the prior art is the base liquid used to produce the combustible gas, which is novel and called a magneliquid. In fact, said liquid is composed by water, carbon-rich and other molecules at least in partial magnetic bond with each other into magnecules (FIGS. 11A–11B to 14). This novelty is evidently absent in the prior art, which produced a combustible gas from ordinary liquids with a conventional molecular structure only.

A second novelty of this invention is that magneliquids permit the achievement of higher concentrations of carbon in water in such a percentage to eliminate altogether the need for carbonaceous rods as the source of carbon for the creation of the combustible gas. In turn, this allows for a large increase of the life of the electrodes, by therefore resolving one of the main problems of the prior art.

Note that the magnetic bond of the carbon to water is in addition to possible solutions and it is preferable than suspensions because magnetic bonds imply much smaller inter-atomic distances, with consequential more efficient behavior under the arc. This additional feature is also not possible in the prior art.

A third novelty of this invention is that magneliquids permit the increases of the energy content of the gas produced beyond the values previously achievable. This is due to the possibility of magnetically bonding to water substances which are not soluble in the same, such as hydrocarbon-base liquids. The latter are entirely decomposed by the arc, resulting in a higher energy content of the gas produced. It is evident that this feature too was not previously.

A fourth novelty of this invention is that magneliquids permit additives, such as carbon and other substances magnetically bonded to water, which bonds increase the conductivity of the magneliquid at least by a factor of five. In turn, said increase of the conductivity permits larger voltages in the arc which, still in turn, imply larger arc gaps with consequential increase of gas production. This was heretofore not possible because the prior art devices could only increase the conductivity of the base liquids by solutions, with consequential increase of electrolysis and related dangers.

A virtually endless number of magneliquids are possible. A few preferred magneliquids for each of the above indicated novelties are identified below.

Similarly, a virtually endless number of geometries are possible via the use of permanent magnets or electromagnets for the joint and/or individual magnetic polarization of water, carbon-base molecules, conductivity-increasing, and energy-enhancing substances.

A fifth novelty of this invention over pre-existing patents is that the combustible gas produced is itself new because it possesses a magnecular structure (FIGS. 6 to 10). The combustible gas produced by this invention is therefore called magnegas. Numerous different compositions of magnegases are possible with various magnetically polarized atoms and molecules, depending on the selected magneliquid, the selected electrodes and other factors. Representative magnegases are described below.

A sixth important novelty of this invention over the prior art is the removal of the plasma from the arc caused by the flow of the magneliquid through the arc itself using a pump that continuously recirculates the magneliquid. Under sufficient speed, said flow displaces the plasma immediately following its formation. This new process implies that the arc continuously generate new plasma, rather than being stationary within the same plasma and augmenting it.

A seventh important novelty of this invention is that the flow of the magneliquid through the arc cools the electrodes, thus increasing their life. Since the plasma created by the arc is at about 7,000 degrees F, the cooling remains effective even when the magneliquid has reached its boiling temperature. This cooling cannot be applied to prior art equipment. As recalled earlier, their process is based on stationary electric arcs within stationary liquids.

Numerous configurations of magneliquid flows through the electric arc are possible as outlined below in the preferred embodiment.

An eight important novelty of this invention is the increase of the volume of combustible gas produced per Kwh which is at least five times that of prior art equipment, thus resolving another main problem of the prior art. In fact, from about 2 cf of combustible gas produced per Kwh in prior art equipment, extensive tests have established the production of about 10 cf per one Kwh for about 20 Kwh and a flow through the arc of 5 gallons of magneliquid per hour. Greater production of magnegas per one Kwh has been measured for greater Kwh and greater speeds of the flow. This result is a confirmation of the basic research at the particle, nuclear and atomic levels, according to which the removal of the plasma from the arc dramatically reduces the recombination of H and O atoms into water, thus increasing the volume of gas produced, and decreasing the dissipation of electric energy into heat, with consequential increase of the efficiency.

A ninth important novelty of this invention is the virtual elimination of carbon dioxide in the production of magnegas. This is due to the fact that the removal of the carbon monoxide from the arc immediately following its creation prevents the same from oxidizing into the carbon dioxide, and permitting a fuel with the lowest known carbon dioxide emission in its exhaust. This resolves another main problem in the prior art.

The above main novelties disclose a new process for the production of the new magnegas using an electric arc within not necessarily carbon-based electrodes in the new magneliquid. The novel environmental and financial advantages of the magnegas over pre-existing fuels are significant.

As it is well known, fossil fuels are altering Earth's atmosphere in a truly serious manner due to their excessive daily consumption of about five hundred millions cars, about one million trucks, and about one hundred thousand planes, plus military, agricultural and industrial usages. The three major environmental problems resulting from such an extreme consumption of fossil fuels are the following:

1) Fossil fuels emit in their combustion exhausts some of the most carcinogenic substances on Earth, which substances are inhaled by humans in amounts that are a large multiple of the carcinogenic substances contained in chemically manipulated food. This toxic emission is established by the dramatic increase of cancer which is now generally admitted by experts.

2) Fossil fuels release during their combustion an excessive amount of carbon dioxide, which is the primary cause of the well known green house effect, whose evidence is established beyond doubt by dramatic climactic changes and large devastations, such as the recent record in the U.S.A. of 176 tornadoes in the month of January 1999 alone, tornadoes which should generally occur during spring, summer and fall.

3) Fossil fuels are depleting the oxygen content of our atmosphere due to the oxygen consumption during their combustion in such extreme volumes which cannot be regenerated any more by forests, not only because the latter were not design by nature to recycle the indicated large volume of oxygen, but also because the forests themselves are being rapidly depleted. Note that the very existence of the green house effect is proof of the oxygen depletion, because the oxygen in the excess carbon dioxide was originally breathable, oxygen.

Magnegas resolves all the above three environmental problems at a cost which is competitive with respect to currently used fuels, thus being suitable for industrial and consumer uses.

In fact, magnegas possesses in its combustion exhausts the lowest percentage of carcinogenic substances, the highest percentage of oxygen and the lowest percentage of carbon dioxide among all fossil fuels of current use. In fact, magnegas emits in the combustion exhausts: I) carcinogenic substances in percentages at least 10,000 times smaller than that of fossil fuels; II) A percentage of pure oxygen which has been measured up to 15% as compared to less than 1 percent oxygen existing in fossil fuels exhaust; and III) carbon dioxide of the order of 3 percent to 4 percent while the combustion exhaust of gasoline contain about 9 percent of carbon dioxide, those of natural gas contain about 12 percent of carbon dioxide under the same performance, and similarly high percentages occur for other fuels.

In summary, magnegas is the only known fuel whose combustion exhaust could sustain life due to its high content of oxygen and the absence of toxic substances.

The production cost of magnegas is competitive to that of fossil fuels. This important prerequisite for the practical use of magnegas as a combustible fuel is due to a variety of factors which include increased efficiency of the process, improved energy content as well as the income producing recycling of non-radioactive liquid waste which can be used as base liquids.

The electric arc is an excellent means for the total recycling liquid waste, because the arc decomposes the waste molecule into a plasma of mostly ionized atoms at a very high temperature. Various processes then occur at the particle, nuclear and atomic levels, which processes cause said plasma to divide itself into volatile components constituting magnegas, plus heavy components that precipitate to the bottom of the equipment, where they can be collected and sold as chemicals useful for fertilizers, and heat acquired by the magneliquid.

Extensive tests have established that the equipment of the prior art for recycling liquid wastes using an electric arc have a very low efficiency because the recycling area (that surrounding the arc) is small compared to the rest of the liquid and for other reasons (the recombination of atoms into molecules under the stationary arc). This requires long periods of times until the entire liquid waste is eventually exposed directly to the arc, with erratic results and very low efficiency.

On the contrary, the forced flowing of the liquid waste through the electric arc using a pump or other means, rapidly exposes the entire liquid to said arc, thus permitting a dramatic improvement in the recycling itself.

In order to understand the competitiveness of magnegas with respect to current fuels, it is important to consider the income from the new recycling of non-radioactive liquid waste according to this invention. Extensive measurements have established that the arc served by a 50 Kwh power unit can recycle liquid sewage as originating from households, industries and municipalities at the rate of 25 gallons per minute when pumped through said arc. This corresponds to the recycling of 1,500 gallons of liquid sewage per hour, and 12,000 gallons per 8 working hours. During this process there is the complete elimination of all bacteriological activities, as expected from the very high electric current, the very temperature, the very intense light, and other extreme features of the arc.

By assuming that electricity costs about $0.08 per Kwh, 50 KW cost $4.00 for the recycling of 1,500 gallons of liquid waste, or $32.00 for the recycling of 12,000 gallons, which yields the cost of recycling said waste of about $0.0027 per gallon. As one can see, such a cost is already competitive over costs currently paid by town and municipalities for recycling liquid sewage, thus implying that the entire cost of operating the equipment, including electricity as well as personnel and maintenance, can be assumed to be paid by the recycling of said liquid sewage.

At the same time, the recycling equipment of this invention, when served by a 50 Kwh power unit, can produce: A) 1,500 gallons per hour, or 12,000 gallons per 8 hours of water useful for irrigation, which can be sold at $0.0003 per gallon yielding an income of $0.30 per hour or $2.40 per 8 working hours; B) about 5 pounds of solid deposits per hour which can be sold at an income of $0.50 per hours, or $4.00 per 8 hours, and C) about 500 cubic feet of magnegas per hour corresponding to 4000 cubic feet per 8 working hours, which are essentially cost free.

To have an idea of the possible usage of the above results, extensive tests have established that an automobile of about 100 HP consumes about 10 cf of magnegas per minute, or 600 cf per hour. The production of 4,000 cf of magnegas as a byproduct of the above recycling of liquid sewage would therefore permit this automobile to run for about 6 hours, which is amply sufficient for ordinary automotive usages.

The point important for this invention is that the magnegas produced by the use of the above recycling of liquid sewage process has no appreciable direct cost, besides those compression, for storage and transportation. Therefore, the novel recycling of liquid sewage of this invention is useful, not only for industrial, but also for consumer applications.

Actual negative production costs of magnegas can be obtained by the use of the above indicated total recycling of other non-radioactive industrial liquid wastes, such as: paint sludge; bilge water; refinery pit oils; oil spills; processing oils; anti-freeze waste from automotive radiators; oils waste from engines; solvent contaminated waters; and other liquid waste. Even though generally not solvable in water, all the above liquid wastes can be recycled with the new process of this invention because said liquid waste can be magnetically bonded to water, therefore permitting its decomposition when exposed to the electric arc, with consequential recycling into nonpollutant substances.

The embodiments hereinafter described relates to a equipment, which may be mobile, for the production of magnegas. A typical example of a power unit usable in this invention is one of about 50 KW DC, requiring 53 KW of AC real power at 450 V, 3-phase, 60 Hertz, and which delivers an arc for 100 percent duty cycle with 44 V DC and 1,000 A. Whenever electric power is not available, the power unit can be provided by a diesel powered electric generator with essentially the same characteristics as that of the DC unit. The main power characteristics can be scaled up or down depending on the required application and market.

It is preferred that the equipment be mobile in the sense that it is entirely contained in a trailer or other platform equipped with wheels for its easy transportation to the desired location. In fact, a primary feature of this invention is that of abandoning the current industrial trend of producing combustible fuels in a main plant, then storing and then transporting them where needed. Due to the easiness of its production, magnegas can instead be produced anywhere desired, thus eliminating the costly storage and transportation needed for the delivery of the fuels where needed.

Figure 16A:
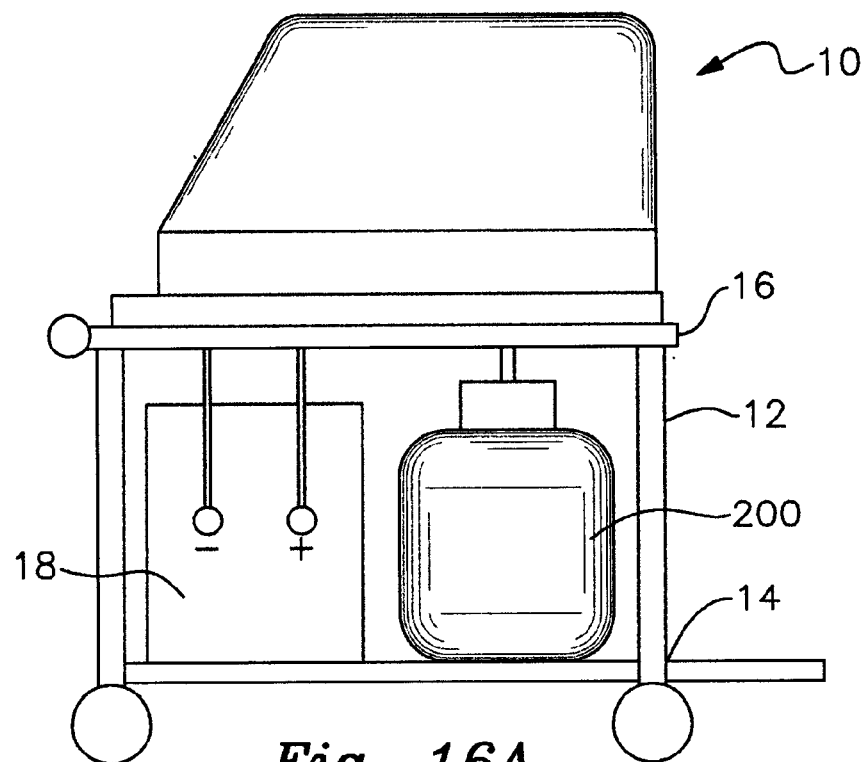
FIGS. 16A and 16B are respective exterior side and exterior front views one of the present invention apparatus.
Figure 16B:
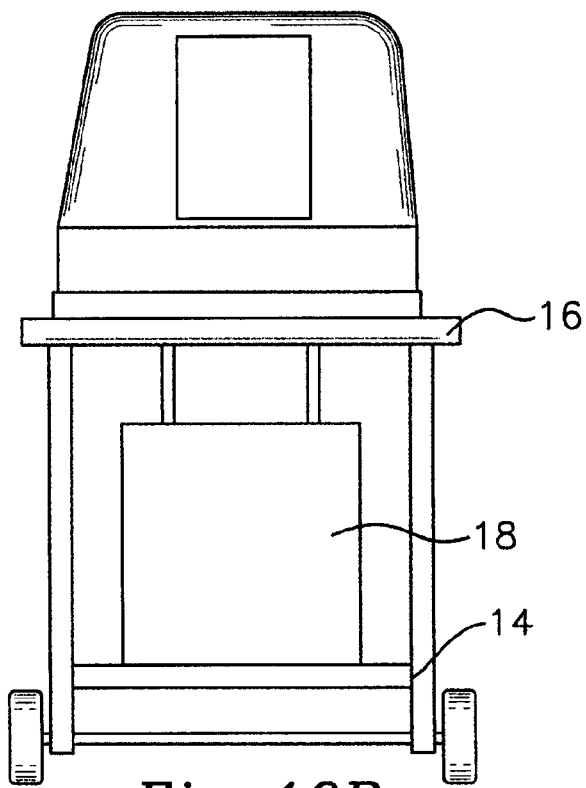

With reference to FIG. 16, the exterior appearance of the equipment is that of a two level wheeled trailer of the approximate total size of 4 ft.×6 ft.×6 ft. The upper portion of the trailer contains the magnegas production unit and related controls, while the lower portion of said trailer contains the power unit as described above and a commercially available storage tank hereon assumed to include a pump to reach the necessary internal storage pressure.

Figure 17:
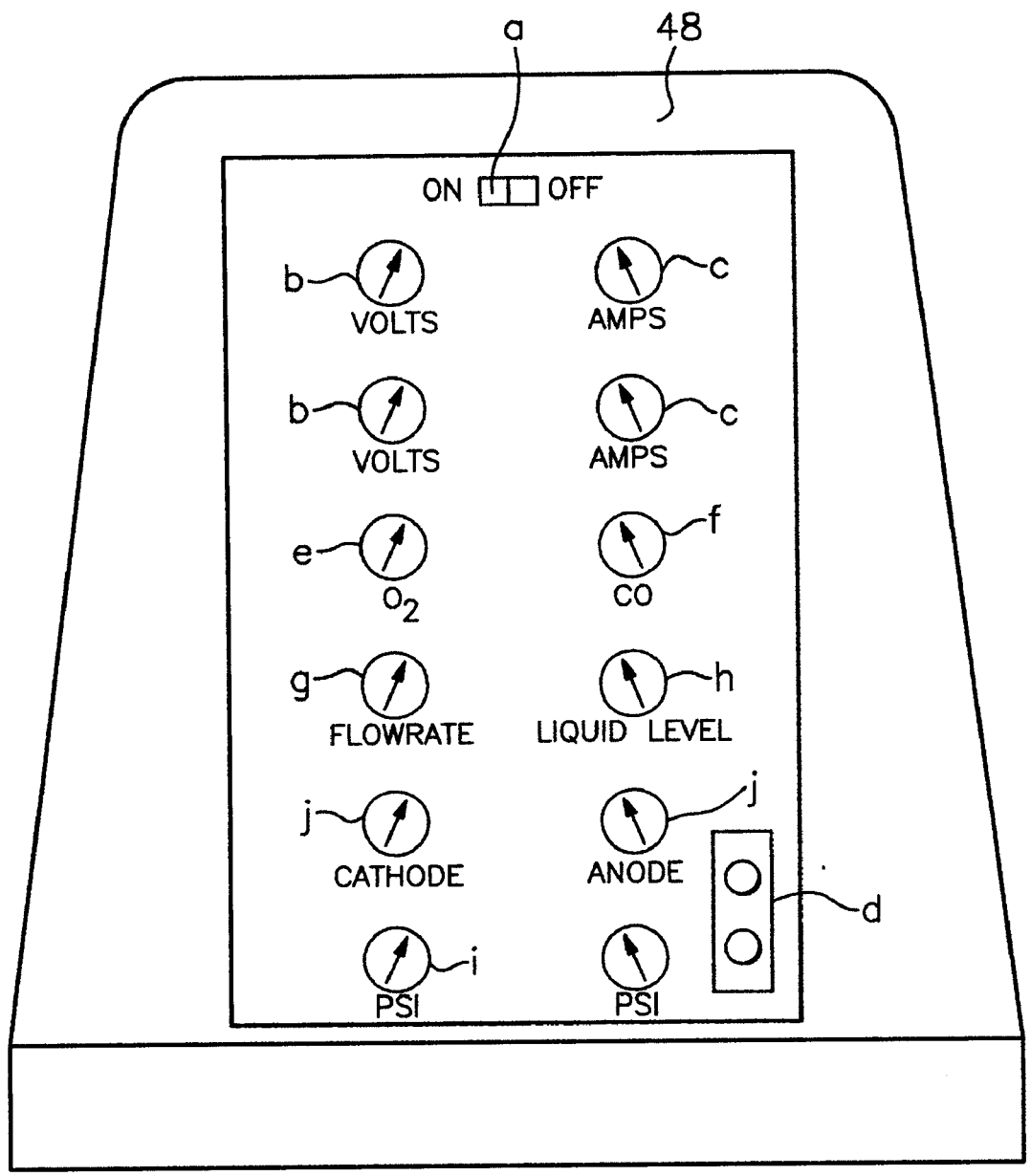
FIG. 17 is a front elevational view of a typical control panel used in association with the equipment of FIGS. 16A and 16B.

FIG. 17 depicts a typical control panel in the magnegas production unit which comprises: on-off main switch "a"; controls "d" for the arc DC voltage and amperage; gauges "b,c" for the measurement of said voltage and amperage; a gauge "e" of the Oxygen content of magnegas with automatic halting of the operation in the event it reaches a predetermined level, usually set at 12 percent; a gauge "If" for the detection of CO in the immediate exterior of the equipment in the event of leaks, with automatic halting of the operation for exterior detection of CO usually set at 0.02 percent; a meter "g" of the flow/volume of magnegas produced per minute; a gauge "h" of the level of the magneliquid producing the magnegas, with automatic arrest of production when said liquid is below a preset level usually of ½ inch below the maximal possible level; a meter "j" monitoring the consumption of the individual electrodes with automatic halting of the operations upon their individual consumption; gauges "i" measuring the pressure of magnegas in the production vessel and, separately, in its storage tank; and other gauges.

Figure 18A:
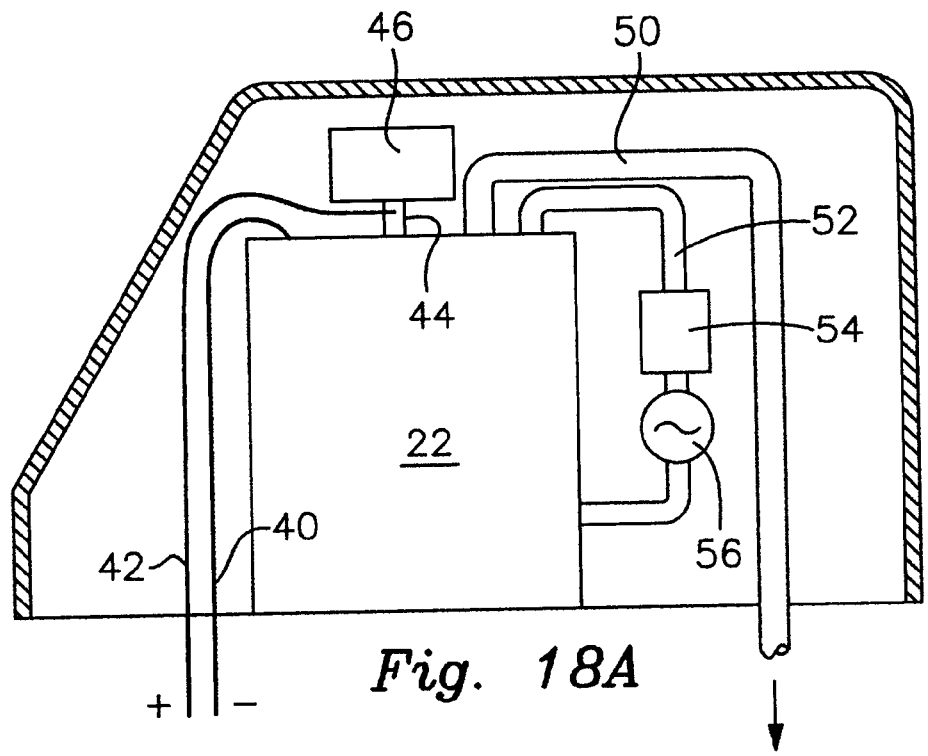
FIGS. 18A and 18B are respective cross-sectional views of the equipment depicted in FIGS. 16A and 16B.
Figure 18B:
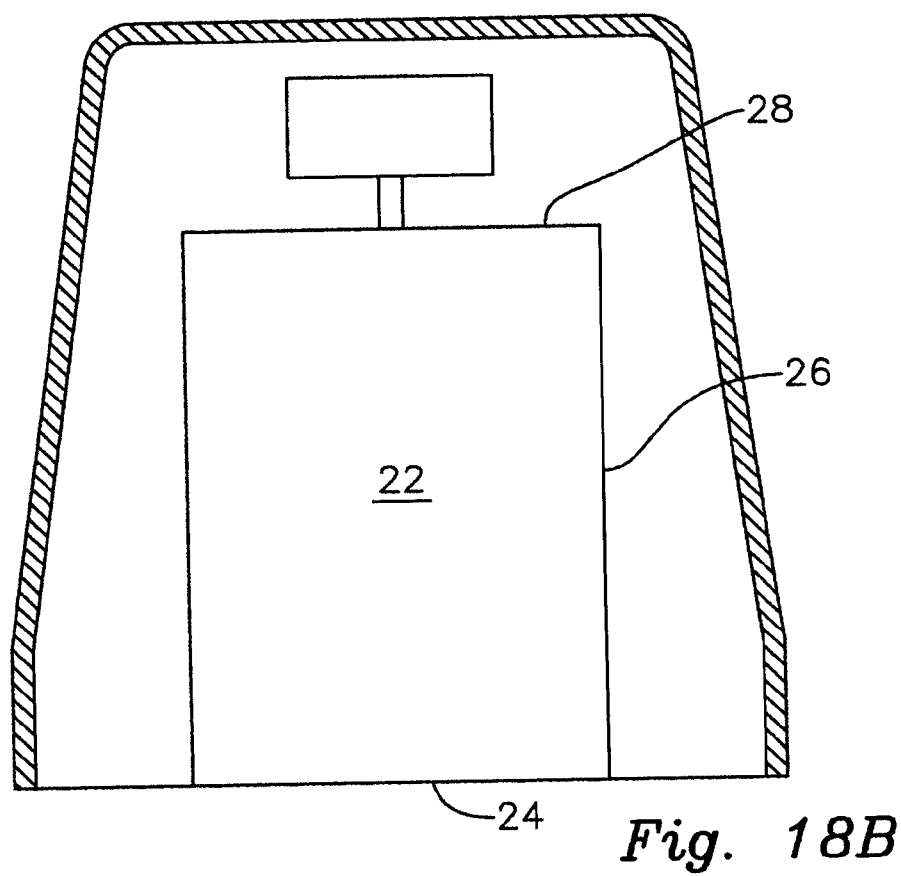

With reference to FIGS. 18A–18B, the magnegas production unit in the upper level of the equipment consists of an all enclosing cover made up of an insulating material such as fiberglass with general thickness of the order of ⅛ inch, in whose interior there are: the magnegas production vessel 22; electrical connections 40,42 to the power unit 18 below, pipes 50 for the deliver of the magnegas produced to the tank below; a pump 54 for the flow of the magneliquid through the arc; equipment 56 for the magnetic polarization of the base liquid; the automatic mechanism 44,46 for the creation, maintenance and optimization of the arc; and other equipment.

Figure 19:
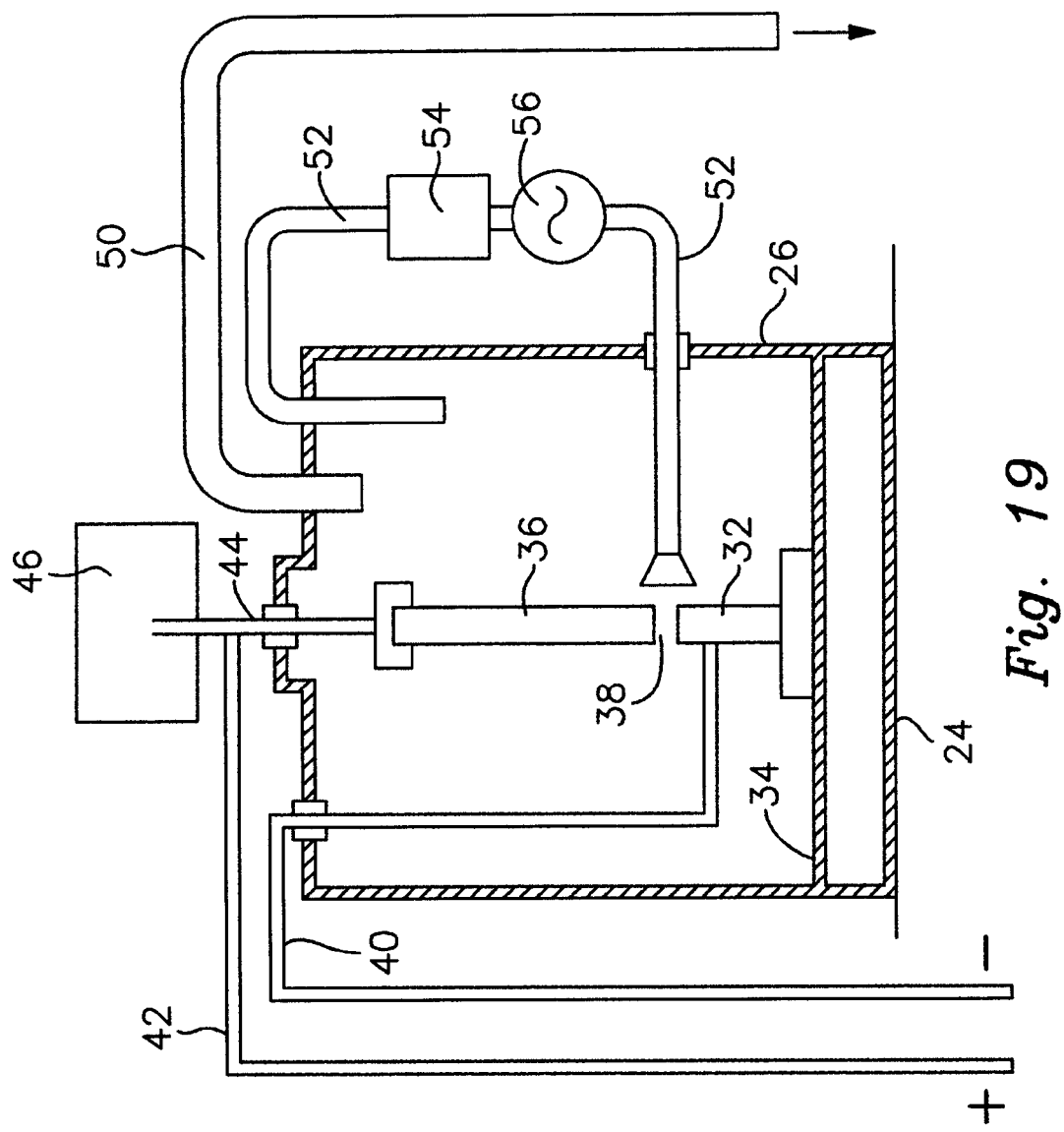
FIG. 19 is a diagrammatic illustration of a typical application of equipment associated with the present invention;.

FIG. 19 provides a sectional view of the magnegas production unit 22 which comprises: an all enclosing reactor vessel fabricated by metal of approximately ¼ inch thickness and approximately 3-½ feet wide, 4 feet long and 2 feet high; the magneliquid more particularly described below, which mostly fills up said vessel, except for a empty layer at the top generally of the order of ¼ inch; the simplest possible realization of the arc consisting of a stationary anode composed by a tungsten rod of ¾ inch diameter and 3 inch length which is vertically placed at the bottom of said metal vessel, and electrically insulated to the same; a cathode of ¾ inch thickness and 1 foot length composed by thoriated tungsten, glassy carbon, conducting ceramics, or other high temperature conductors, placed vertically head-wide against said anode; the automatic arc mechanism more appropriately described below, which initiates the arc by moving downward the cathode to contact with the anode, and subsequently retracts to the arc gap of about 1/32 inch, maintenance of the arc by keeping approximately constant its voltage via electromechanical means, and by optimizing said voltage via its variation as per gauge in the control panel; the flow of the magneliquid though the arc very simply realized by a tube 52 of approximately ½ inch thickness terminating in a beak at least ½ inch wide and ¼ inch thick, which tube is placed perpendicular to the cylindrical symmetry of the electrodes at the arc level in such a way that its ½ inch×¼ inch terminal beak is also placed vertically to invests not only the arc, but also at least ¼ inch of the tips of the electrodes; an outside pump 54 circulating the magneliquid through said arc; means 56 for the magnetic polarization of the magneliquid more appropriately described below; sensors for other controls and other items.

As shown in FIGS. 17, 18A–18B and 19, the system 10 is for the production of a combustible gas from an electric arc submerged in a magnetic polarized liquid. The system comprises a support assembly 12. Such assembly has a first or lower support surface 14 and a second or upper support surface 16. A source of potential 18 is positioned on the first support surface.

Next provided is the gas production unit 22. Such unit 22 is supported on the second support surface. The gas production unit 22 has a base 24, an upstanding side wall 26 and an upper cover plate 28. A non-consumable anode 32 is supported in the gas production unit by the lower surface with an insulating base 34 between the lower supporting surface and the anode. A consumable cathode 36 is also located within the gas production unit 22 and supported from above. The relationship is to create a space 38 between the anode and the cathode. Electrical line 40,42 couple the source of potential and the anode and the cathode respectively.

A cathode supporting shaft 44 of an electrically conducting material extends through the cover plate 28. The supporting shaft 44 includes a holder for the cathode 36, which is supported there beneath. A drive member or drive means 46 is also provided to move the cathode 36 toward the anode 32 during operation and use. Automatic controls 48 are located there above for monitoring and controlling the system during operation and use.

A first fluid line 50 couples the cover plate 28 with the pressure tank 200. This is for the passage of gas produced in the production unit 22. Such line 50 couples to the pressure tank 200 for storage of the gas.

A second fluid line 52 couples the cover 28 of the gas production unit 22 and the space 38 between the anode 32 and the cathode 36. Such second line 52 includes a pump 54 and a magnetic polarization unit 56 to magnetically polarize the liquid circulating therethrough. The pumped fluid further cools the arc during operation and use.

As can be seen in the drawings, the anode 32 is preferably fabricated of tungsten, a non-consumable electrode. The cathode 36 is preferably fabricated of a consumable material such as thoriated tungsten, glassy carbon, or conductive ceramic material.

Figure 20:
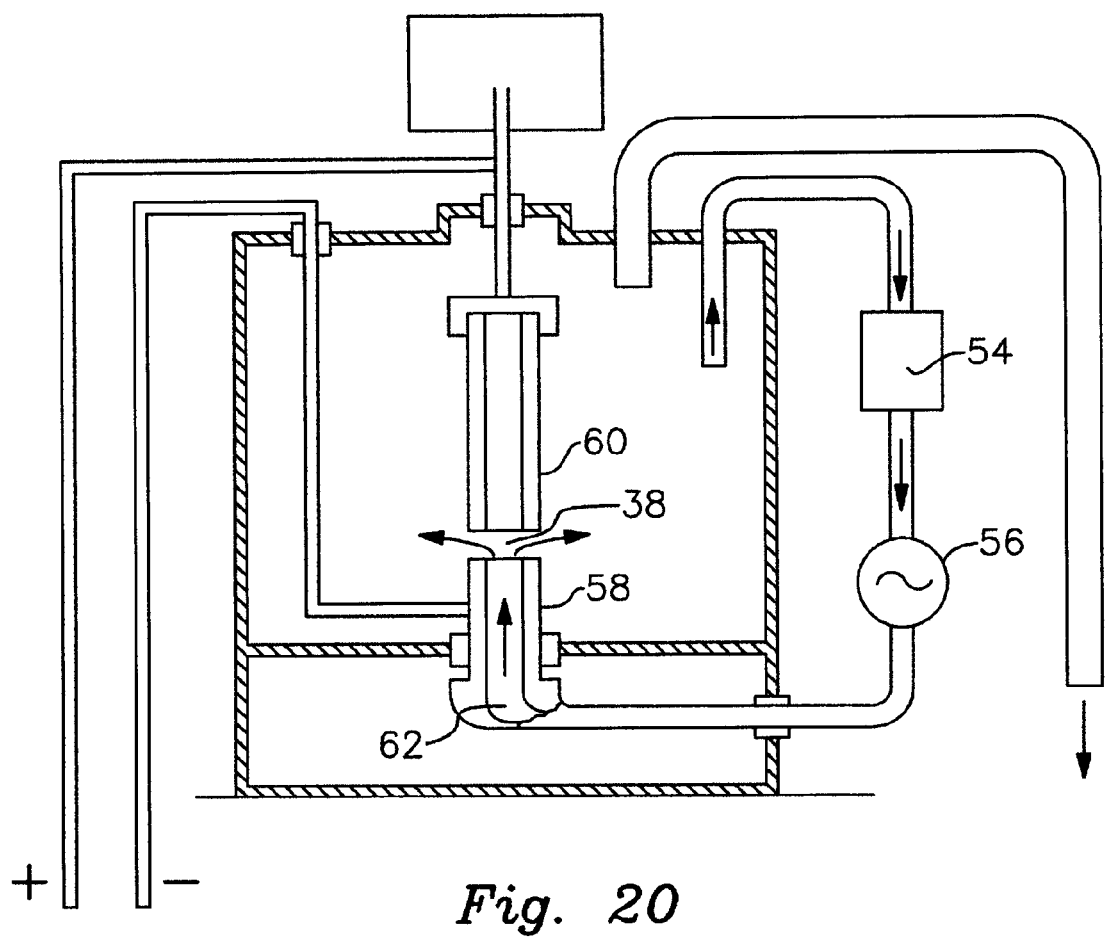
FIG. 20 is a diagrammatic illustration of an alternate application of equipment associated with the present invention.

FIG. 20 describes essentially the same automatic arc system as that of FIG. 19, although with an improved flow of the magneliquid through an anode composed of a hollow tungsten of about 1 inch OD and ½ inch ID through which the magneliquid is forced to flow toward the arc, with the cathode 60 given by a tube of the same OD and ID as that of the anode 58 to avoid uneven wears, although said cathode 60 has no necessary internal flow of the magneliquid.

The embodiment of FIG. 20 is similar to that described above but the anode 58 and the cathode 60 are both formed of a hollow tubular configuration. They have a common interior diameter and a common exterior diameter. They are spaced from each other along a common axis. In this manner, the output from the pump 54 feeds the magnetic polarized fluid up through the center 62 of the anode 58 and outwardly therefrom into the space 38 between the anode 58 and the cathode 60 for cooling purposes.

Figure 21:
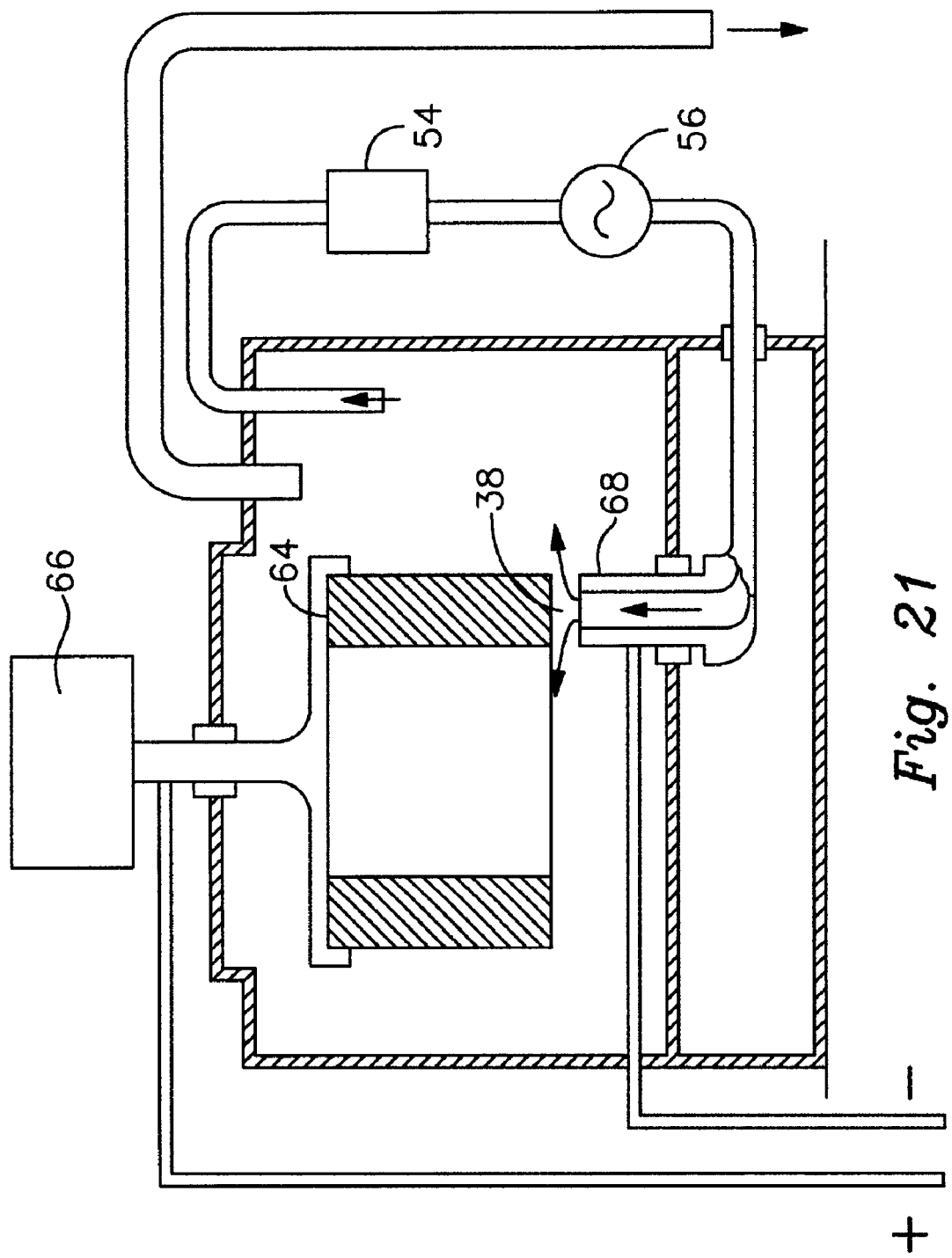
FIG. 21 is a diagrammatic illustration illustrating yet another typical application of the equipment associated with the present invention.

FIG. 21 depicts an arc system possessing a dramatically longer life as compared to those of FIGS. 19 and 20, which comprises the same long life hollow tungsten anode 68 as that of the preceding FIG. 20 with internal flow of the magneliquid toward the arc served by an outside pump, plus a cathode composed by thoriated tungsten, glassy carbon, or conducting ceramics in the shape of a cylinder of approximately 1 inch thickness, 6 inch radius and 1 foot in length, which is caused to rotate vertically head-wise against the edge of said anode, as well as to advance and retract as requested by the initiation of the arc, its maintenance and optimization. Depending on the selected material, the size and the cooling flow, the cathode 64 of the above cylindrical configuration can have the same long life of the anode 68.

The embodiment of FIG. 21 is also similar to the embodiments above, but the cathode 64 is formed as a large hollow tube having a common wall diameter. A motor 66 functions to rotate the cathode during operation and use. The anode 68 is formed as a small hollow tube receiving the output from the pump 54 for movement of the fluid therethrough to the space 38 between the anode 68 and cathode 64 for cooling. The exterior diameter of the anode 68 is essentially equal to the wall thickness of the cathode 64.

As described earlier, the magneliquid of this invention is composed by a base liquid rich in H and O, plus the addition of specially selected substances to increase the energy content of the magnegas produced, and to increase the volume of said gas by the addition of suitably selected acids or other substances which increase the conductivity of the original liquid.

A representative case of base liquid is given by any form of water readily available, such as: tap water, sea water, lake water, well water, etc., or liquid waste to be recycled, the latter being more appropriately described below. Representative example of additives are given by: coal in powder form which is then subjected to magnetically bonded to the base liquid, resulting in a new form of gasification; hydrocarbons in liquid forms and other substances that are not generally solvable in water; other substances that are solvable in water and have a high carbon content, such as ethylene glycol, anti-freeze, sugar and their derivatives. A virtually endless number of surfactants can also be added to achieve a better mixture of solution and magnetic bond. Finally, preferred additives to increase the conductivity of the magneliquid are acids solely constituted by H, O, and C, such as acetic acid.

Representative total volumes of magneliquids are 20 gallons which can produce 360,000 gallons of magnegas at ordinary pressure and temperature. Needless to say, the preferred embodiment contains means for periodical re-filling of the magneliquid to the originally selected volume and composition.

Means for the creation of the magneliquid from the above identified substances are rather diversified because they depend on the substance selected and their scope. The means can be classified into:

1) Creation of magneliquid prior to the initiation of the production of magnegas. Depending on the substance which is intended for magnetic bonding to the water, this phase may require:
   1.1: The magnetic polarization of the water alone, and the subsequent addition of said substance in a magnetically unpolarized form;
   1.2: The magnetic polarization of the substance alone and its addition to a magnetically polarized water;
   1.3: The magnetic polarization of both the water and the desired substance, either jointly after mixing or separately prior to mixing.

Figure 22A:
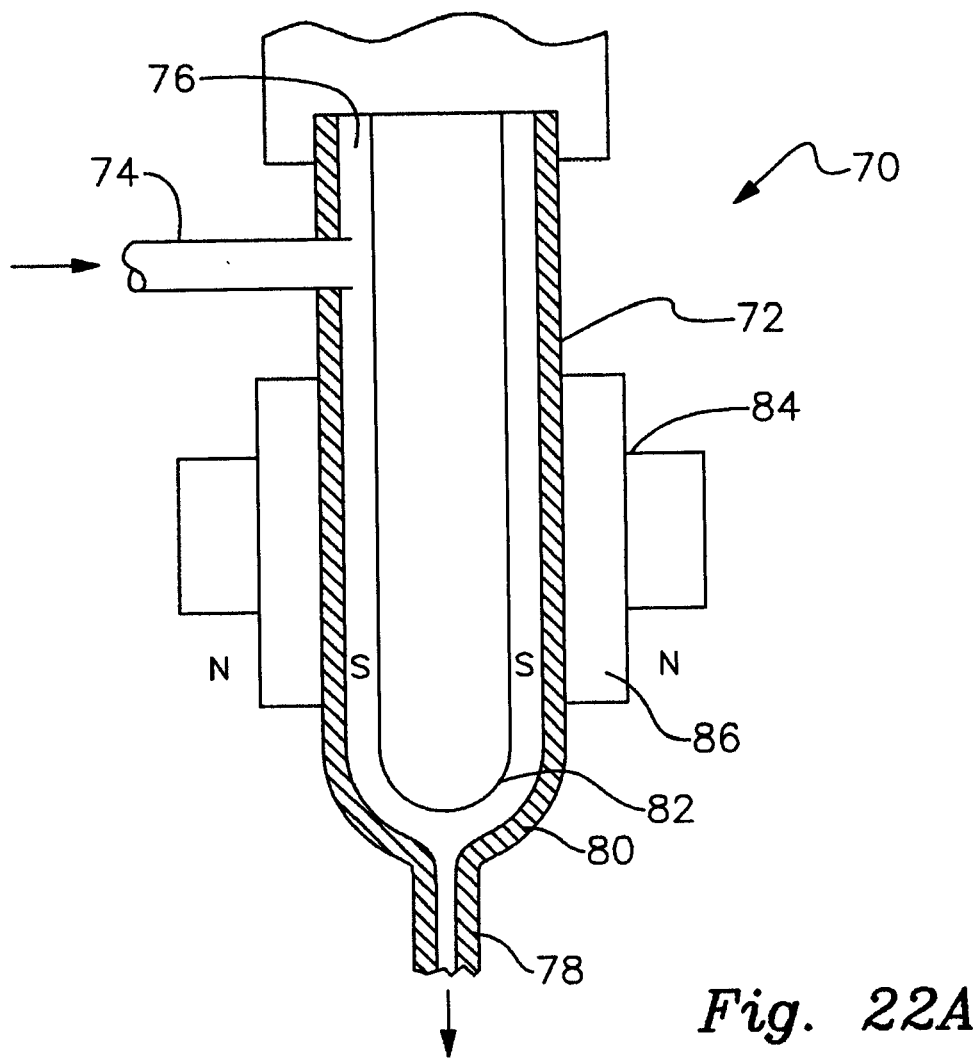
FIG. 22A is a diagrammatic illustration depicting a typical application of equipment for magnetically polarizing water with electrically conductive carbon particles in suspension therewith.
Figure 22B:
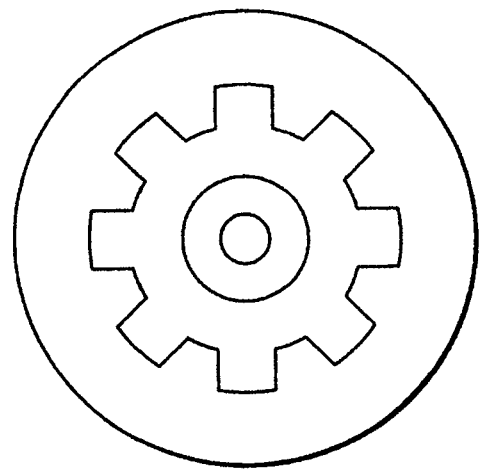
FIG. 22B is a cross-sectional plan view of FIG. 22A.

The above magnetic polarizations can be achieved via a virtually endless number of magnet configurations, each admitting different magnetic polarities. FIGS. 22A–22B depict an embodiment consisting of eight rare earth permanent magnets 86 of ½ inch×1 inch×3 inch each having a magnetic field of approximately 40,000 G with polarization on the sides which are placed along a non-conducting cylinder 72 of approximately 3 inch OD and 2-¾ inch create an internal radial field of the same magnetic polarity. An additional internal cylinder 82 creates a cylindrical passage of the liquid about ⅛ inch thick in the immediate proximity of said permanent magnets 86. The liquid to be magnetically polarized is forced to move in between said two cylinders 86,72, thus being the maximal possible proximity of said permanent magnets 86, by therefore acquiring the indicated magnetic polarization. This particular embodiment is served by the same pump 54 as that used for the flow of the magneliquid.

The assembly 70 as shown in FIGS. 22A–22B and 23A–23B is for magnetically polarizing water with electrically conductive carbon particles in suspension therewith. Such assembly 70 includes a generally cylindrical outer container 72 in a tubular configuration. Such container has an inlet opening 74 adjacent to the first end 76 for the input of liquid to be magnetically polarized. Such container also has an outlet opening 78 at the second end 80 for the discharge of the liquid. An interior inner insert 82 is in a generally cylindrical configuration. It has an exterior diameter less than the interior diameter of the outer container 72. In addition, mechanisms 84 are provided to effect a magnetic field between the outer container 72 and the inner insert 82. In this manner the passage of a liquid formed of water with suspended magnetizable particles between the input and the outlet openings 74,78 will effect the magnetic polarization of the liquid. In the preferred embodiment, the mechanisms include a plurality of magnets 86 spaced around the periphery of the outer container. The inner and outer containers 82,72 are fabricated of a diamagnetic material.

Figure 23A:
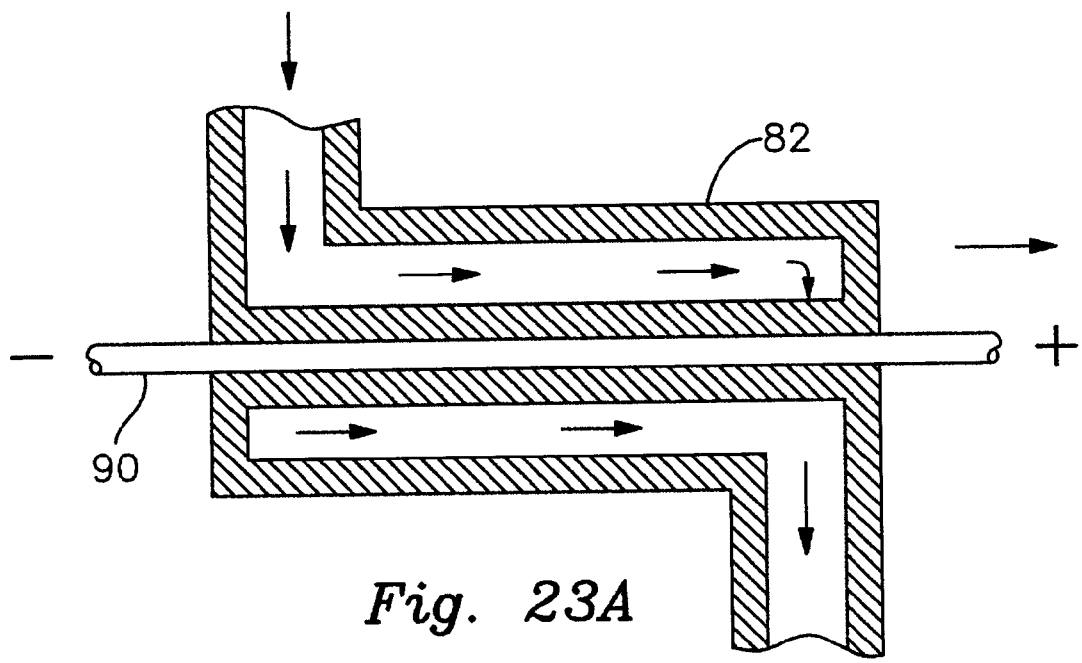
FIGS. 23A and 23B are partial cross-sectional view of an alternate application of equipment used for the liquid magnetic polarization unit.
Figure 23B:
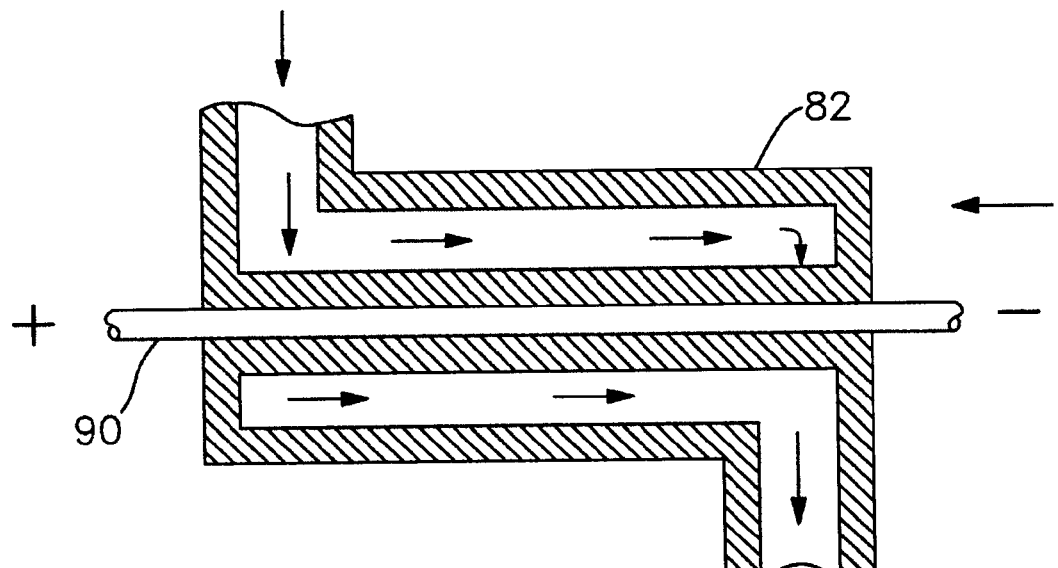

FIGS. 23A–23B depict another configuration for the magnetic polarization of the magneliquid which essentially consists in utilizing the very high electric current that passes through the conductors serving the arc, and by causing the liquid to flow in a non-conducting tube 82 placed in their immediate exterior of about ⅛ inch thickness and ⅛ inch cylindrical passage for the liquid. This magnetic polarization can be served by the same pump 54 as that used for the flow of the magneliquid through the arc, or by a different pump. In such embodiment, the inner insert 82 is hollow with a current conducting electric line 90 therethrough. The inner and outer containers 82,72 are fabricated of a dielectric material.

To properly describe the preferred embodiment for the automatic feeding and control of the arc of this invention, we first note that the technology which is fully valid for arc in air, is basically inapplicable for arcs within ordinary liquids, let alone magneliquids. For instance:

1) The gaps for arcs in air generally of the large order of ½ inch, are dramatically reduced for the creation of an arc within water under the same KWH;
2) The generally high volts of arcs in air, such as 90 V used by plasma cutters in air with 10 KWH, are dramatically reduced for underwater arcs, generally down to ⅓ of the value in air;
3) The various means available for the activation of the arc at a distance when in air are inapplicable for the creation of underwater arcs. For instance, the high frequency Tesla discharges often used for the activation of the arc at a distance in air, are inapplicable underwater, because the dramatically different physical-chemical conditions in the liquid do not permit any high frequency discharge at all.

Extensive tests have established that:

i) The arc voltage cannot be controlled via the gap because each arc within each liquid requires its own characteristic voltage per each KW and related gap.
ii) The volume of combustible gas produced per KW increases with the increase of the KW. For instance, repeated measurements have established the production, using prior art equipment, of 24.5 cubic feet of gas produced per hours for 13 KW, which yield the Efficiency E=24.5 cfh/13 Kwh=1.86 cf/KW. The same equipment with the arc operating under 26 KW produces 70 cfh, which yield the Efficiency E=70 cfh/26 KWH=2.69 cf/KW. The same equipment operated with 39 KW produces 150 cf with efficiency increase to E=150 cf/39 KW=3.87 Cf/KW. While the KW double and triple, the efficiency increases in correspondence 2.69 cf/KW=145% of 1.86 cf/KW, and 3.87 cf/KW=145% of 2.69 cf/KW, thus confirming an increase of the efficiency which is proportional to the KW. Note that the arc voltage in the sequence of the above three tests is: 35 V DC, 53 V DC and 62 V DC.
iii) The characteristic arc voltage per each given power source varies with the variation of the absorbed KW, the chemical composition of the adopted liquid, the nature of the electrodes, and other factors.

In view and consideration of the above features, it is evident that the most efficient automation of the arc feeding mechanism is that based on the optimization of the voltage of the arc per each given value of the KW and per each given chemical composition of the magneliquid.

The preferred remotely controlled automation of arc mechanism is therefore that which identifies the gap corresponding to the highest possible voltage, and said highest possible voltage can be adjusted for different KW and different liquids.

A typical remotely controlled production of magnegas using a FIG. 21 configuration is the following:

STEP 1: Electric power is switched on in the main panel with amperage automatically set at a minimum of about 100 A, while the cylindrical cathode automatically initiates its rotation on the edge of the stationary anode;

STEP 2: The automatic control mechanism advances the cylindrical cathode to the point of initiation of an arc, as identified by the absorption of amperes;

STEP 3: The automatic control mechanism then retracts said cylindrical cathode to the characteristic arc gap, while the amperes are released to reach a preset limit, say, of about 900 Amperes, thus establishing a regular arc;

STEP 4: The arc gap is controlled by the characteristic DC voltage of 44 V DC;

STEP 5: Whenever the arc voltage increases, the automation moves forward the cylindrical cathode to restore said characteristic gap value and related voltage;

STEP 6: The operator has the capability of optimizing said characteristic arc voltage by setting its value to the maximal volume production of the magnegas, as measured by the flowmeter in the control panel;

STEP 7: The operation of the equipment then continues automatically until the entire consumption of the cathode tube, at which time the remaining part of the carbon cylindrical cathode is retracted, say, of about ½ inch, and the equipment is switched off automatically.

As recalled earlier, a fundamental aspect of this invention is that the new magnegas is cost competitive with respect to existing fuels. In turn, such a competitiveness can be reached by using the new process of this invention for the primary duty of recycling non-radioactive liquid waste. In fact, such a recycling implies per se an income. Additional incomes arise from the resulting water usable for irrigation and the solid precipitates usable for fertilizers. Magnegas is then essentially obtained as a byproduct thus resulting to be essentially free, except for storage and other use related charges.

Figure 24:
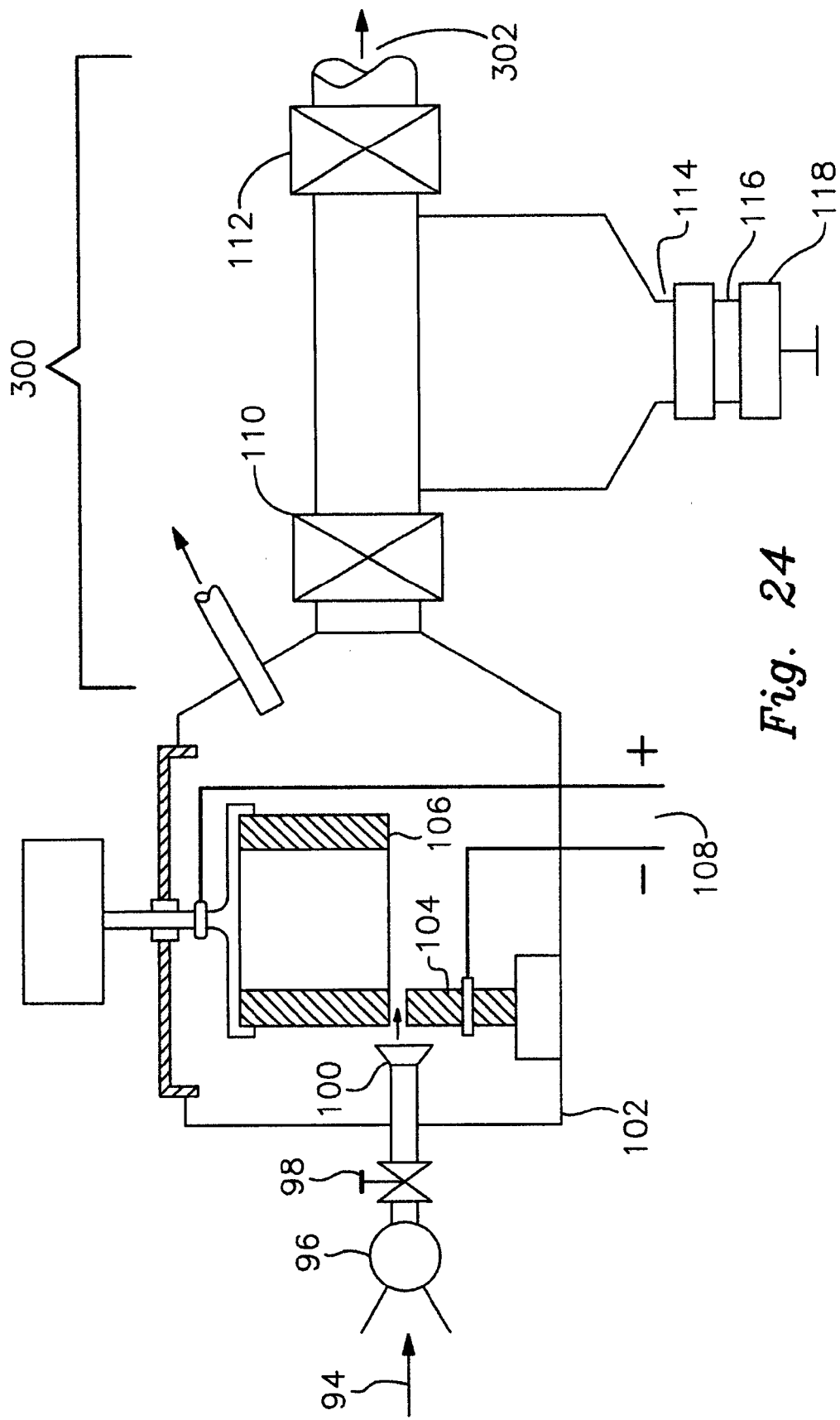
FIG. 24 is a diagrammatic cross-sectional view of a system similar to that shown in FIG. 21 but designed for the treatment of waste.
Figure 25:
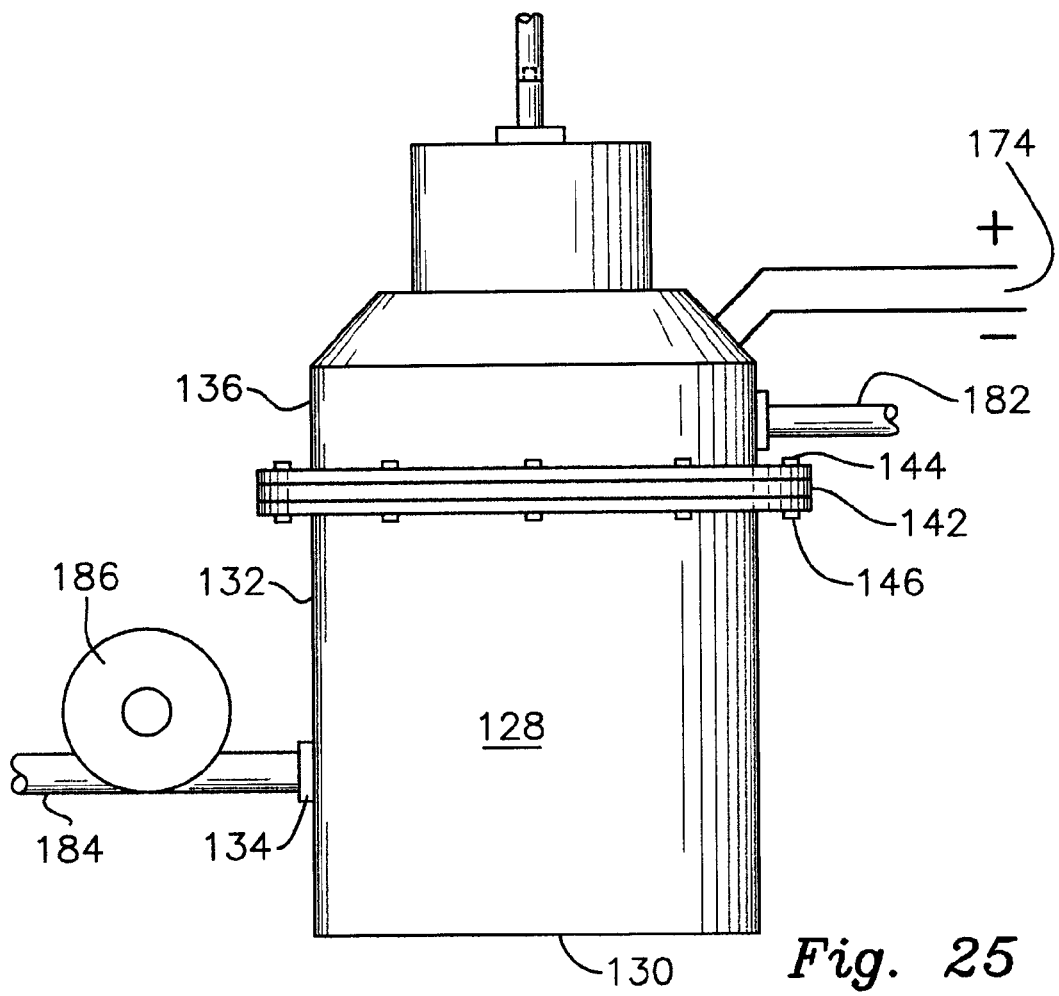
FIG. 25 is a diagrammatic side elevational view of another typical application of equipment associated with the present invention.
Figure 26:
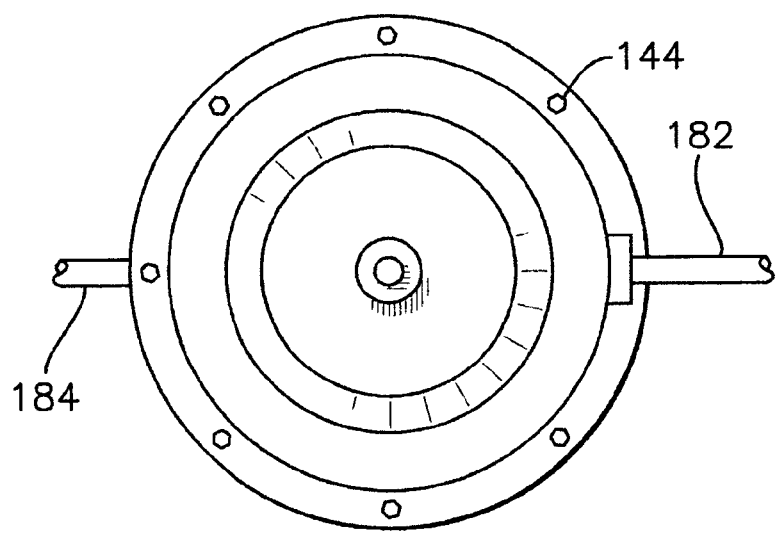
FIG. 26 is a top plan view of FIG. 25.
Figure 27:
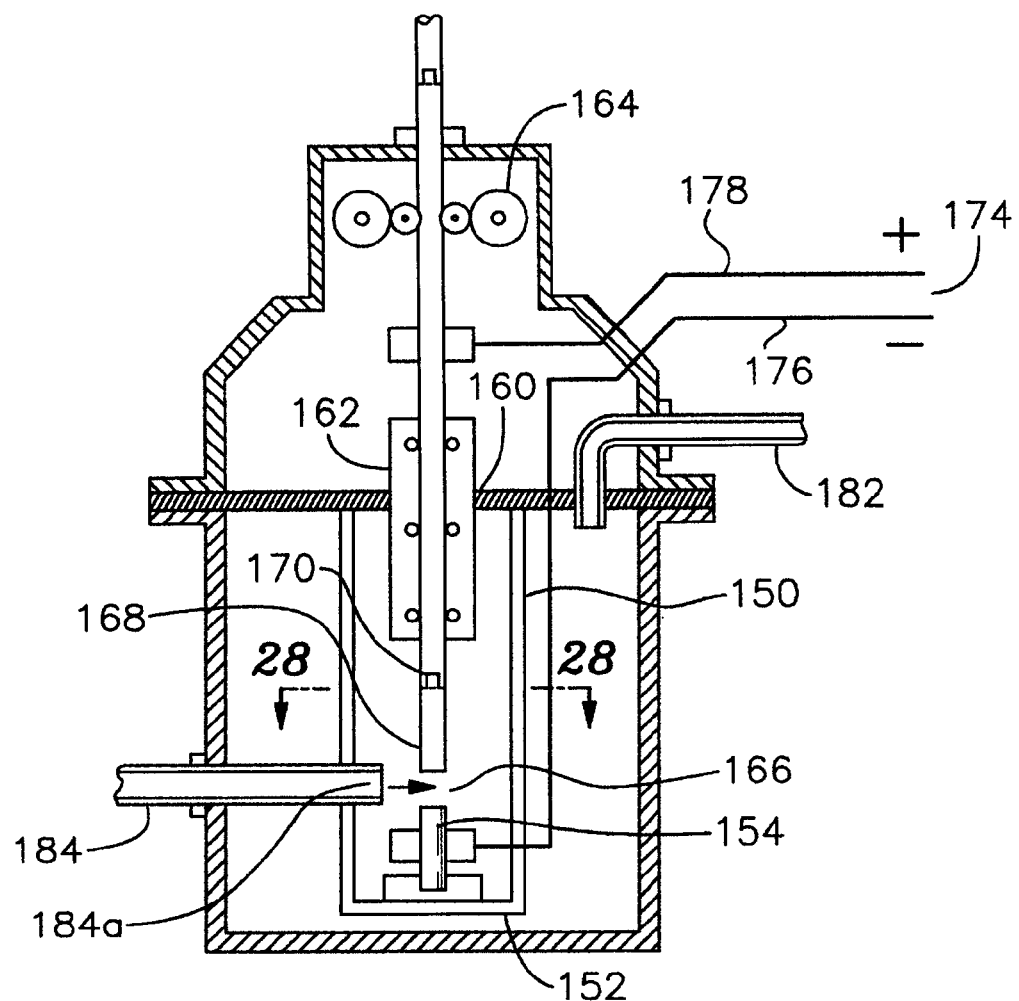
FIG. 27 is a cross-sectional view of FIG. 26.
Figure 28:
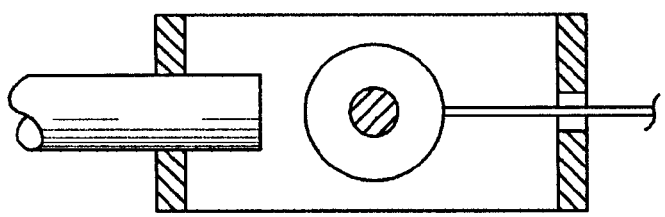
FIG. 28 is a cross-sectional view taken along lines 28—28 of FIG. 27.

FIG. 24 depicts a typical embodiment for the equipment of this invention used for the recycling of liquid sewage from households or municipalities, which is composed by any desired number of individual stations, each with the following typical main structure and functions:

I) A DC arc power unit with 44 V DC and 1,000 A DC, or any equivalent electric generator powered by a diesel engine;

II) A metal vessel in various sections and shapes as described below with about 1 inch general thickness to withstand high pressures in which said liquid sewage is made to flow, and comprising in the flow direction: a pump; on-off valve of said flow; a restriction of the inflow line down to 1 inch ID and 3 inch length to force the liquid sewage to flow through the arc; the electric arc station including electrodes placed directly in front of said inflow line restriction, rapid means for their replacement, and automatic means for initiating, maintaining and optimizing the arc as in preceding embodiments; the outlet for the magnegas produced; a station for the degaussing of the liquid coming out of the arc consisting of at least six sources of microwaves with resonating water frequency radially disposed outside a restriction of said vessel of 2 inch in ID and 5 inches in length and emitting their resonating frequency toward the axial center; a chamber with dimension 5 ft.×5 ft.×5 ft. for the precipitation of solids to the bottom, with means for their removal at said bottom without halting the operation; a filtering station; and the final outflow of water usable for irrigation.

III) A novel long life arc mechanism specifically designed for recycling liquid sewage in which the anode is composed by a tungsten rod of 1 inch diameter and 5 inch length, and the cathode is a cylinder of 1 inch thickness, 6 inch in radius and 1 foot in length constituted by carbon in graphite form as conventionally used for welding, which is made to rotate head-wise on the edge of said tungsten anode, said arc being controlled by the same automatic mechanism as that previously described, and said cathode being made of Carbon due to the general lack of sufficient carbon in the liquid sewage to be recycled; means for rapidly changing said electrodes; and various controls as per preceding embodiments.

The final machine or system disclosed is diagrammatically represented in FIG. 24. Such system is for the treatment of liquid sewage. Such system comprises a liquid sewage inflow line 94 with a pump 96 in association therewith to effect the feeding therethrough of liquid fluid to be treated. The pump is followed by a shutoff valve 98 and an exit port 100.

A reaction vessel 102 receives the output of the exit port 100. Such vessel 102 contains an anode 104 and a cathode 106 with a space therebetween. Also included is a source of electrical potential 108 to effect the flow of current across the space 138 between the electrodes which acts to effect an arc. The exit port 100 is located adjacent to the space 138 between the anode 104 and the cathode 106 to effect the cooling thereof during operation and use.

A fluid output assembly 300 is next provided. Such assembly 300 includes a degaussing station 110 for the liquid sewage passed through the arc and treated by the arc.

A mechanical filtering station 112 and an irrigation water outflow portion 302 next follows the degaussing station 110.

Lastly, is a solid precipitation chamber or centrifuge 114 with a shut off valve 116 and removable solid container 118. Such container is located between the degaussing station 110 and the filtering station 112 and functions for the receipt of solid waste to be disposed of.

FIGS. 25–28 depict another representative typical application of a system for the production of a combustible gas from an electric arc submerged in liquid. A reaction vessel 128 has a base 130. The reaction vessel 128 also has an upstanding side wall 132 provided with an apertured flange. The reaction vessel 128 also has a cover plate 136 provided with an apertured flange.

An apertured intermediate support plate 142 is provided between the flanges of the side wall 132 and cover plate 136. Bolts 144 and associated nuts 146 are provided for the releasable coupling of the support plate 142 between the flanges. The support plate 142 has downwardly extending legs 150. A horizontal component 152 supports a cylindrical tungsten anode 154. A carbon rod cathode 170 is supported in the vessel 128 and extends through an aperture 160 in the cover plate 136 and sealing bushing 162 in the support plate 142. Automatic feeding controls 164 are provided to advance sequential carbon rods 170 toward the anode 154 to create a space 166 between the anode 154 and the cathode 170. A projection 168 is adapted to be fit within a recess of the next adjacent carbon to effect the continuous feeding of carbon rods into the reaction vessel 128.

A source of electrical potential 174 is next provided. The source of electrical potential has electrical leads 176,178 separately coupling the source of potential with the anode 154 and with the cathode 170 to generate a gas-producing electrical arc between the anode 154 and cathode 170.

A first fluid line 182 is provided. The first fluid line is coupled with respect to the vessel 128 and functions to allow the passage of gas produced in the vessel 128.

A second fluid line 184 is coupled with respect to the vessel 128. The second fluid line 184 has an outlet orifice 184a adjacent and transverse to the space 166 between the anode 154 and the cathode 170. A pump 186 feeds liquid to the space 166 between the anode 154 and the cathode 170 for cooling purposes during the application of electrical potential to the anode 154 and the cathode 170 for the creation of combustible gas.

The present invention also includes the gas, the liquid for generating the gas and the method of generating the gas. More specifically, the new and improved combustible gas fabricated by the passage of a magnetized liquid containing water and carbon particles through a submerged electric arc, the gas including hydrogen oxygen and carbon dioxide constituting no more than about 12 percent of the gas. The new and improved magnetized liquid contains water and carbon particles of between about 10 and 15 percent of the liquid and is adapted for use in generating a combustible gas including hydrogen, oxygen and carbon dioxide constituting no more than 12 percent of the gas by the passage of the liquid through a submerged electric arc. Lastly, the new and improved hydrogen, oxygen and no more than 12 percent carbon dioxide includes the steps of forming an electric arc submerged under a liquid, the liquid containing water and carbon particles, magnetizing the liquid, and flowing liquid through the arc for cooling purposes.

As seen from the foregoing description, the present invention satisfies a long felt need to provide an apparatus for producing a novel clean and non-pollutant combustible gas as well as a recycling apparatus to treat waste liquids, including industrial and sewage waste, thereby improving the environmental conditions.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An apparatus for the production of a clean burning combustible gas comprising:

an enclosed pressure resistant reactor chamber housing a pair of electrodes and being substantially filled with a liquid;

an electric power supply for generating an underliquid arc between said pair of electrodes in said enclosed chamber;

means for initiating, maintaining and optimizing said arc;

means for continuously circulating and concentrating a flow of said liquid directly through said arc between said pair of electrodes; and means for recovering from said enclosed chamber a combustible gas produced by said underliquid arc, wherein an inlet to said means for recovering said gas is located above a top surface of said liquid so as to collect the gas as it bubbles to the top of the liquid, wherein said arc decomposes the molecules of said liquid resulting in a plasma of atoms and their combinations exposed to intense electric and magnetic fields existing at atomic distances from said arc, wherein said flow of said liquid directly through said arc continuously removes said plasma from said arc, wherein following said removal of said plasma from the arc, said plasma cools down in said liquid resulting in a clean burning combustible gas, wherein said flow of the liquid through said arc minimizes the recombination of hydrogen and oxygen into water caused by the arc itself thereby increasing the efficiency of said apparatus, wherein said flow of the liquid through said arc minimizes the oxidation of carbon monoxide into carbon dioxide caused by the arc itself thereby increasing the efficiency of said apparatus and improving the environmental properties of said gas, wherein the flow of said liquid trough said arc cools to electrodes thereby increasing the useful life of the electrodes, wherein said flow of said liquid trough the arc exposes said liquid to intense electric and magnetic fields existing at atomic distances from the arc.

2. The apparatus according to claim 1, wherein said gas is detectable by the presence of peaks when analyzed with mass spectrometry equipment, and said peaks have no infrared signature other than the infrared signature of their constitutents.

3. The apparatus according to claim 1, wherein said liquid which has been exposed to the arc is detectable by the presence of peaks when analyzed with mass spectrometry equipment, and said peaks have no ultraviolet signature other than the ultraviolet signature of their constitutents.

4. The apparatus according to claim 1, wherein the combustion exhaust of said combustible gas is rich in breathable oxygen originating from said liquid, said oxygen being suitable to replenish atmospheric oxygen depleted by fossil fuel combustion.

5. The apparatus according to claim 1, wherein the combustion exhaust of said gas contains no toxic substance.

6. The apparatus according to claim 1, wherein the flow of said liquid directly through said arc permits the increase of substances in solution and suspension in said liquid.

7. The apparatus according to claim 6, wherein the increased substance in suspension is coal that is decomposed by said arc.

8. The apparatus according to claim 1, wherein said electrodes are made of nonconsumable conducting material, resulting in a combustible gas solely composed of the elements of said liquid.

9. The apparatus according to claim 8, wherein said liquid is water, resulting in a combustible gas comprising hydrogen and oxygen.

10. The apparatus according to claim 1, wherein said power supply produces a continuous DC current.

11. The apparatus according to claim 1, wherein said power supply produces a DC pulse.

12. The apparatus according to claim 1, wherein the power supply produces alternating current.

13. The apparatus according to claim 1, wherein the power supply produces alternating current with a frequency optimized for increasing the rate of separation of the liquid molecules.

14. The apparatus according to claim 1, wherein the electric arc occurs between an electrode composed of a non-consuming conductor material and another electrode composed of a consumable carbon base material.

15. The apparatus according to claim 1, wherein the electric arc occurs between electrodes composed of a consumable carbon base material.

16. The apparatus according to claim 1, wherein the electric arc occurs between rod shaped electrodes.

17. The apparatus according to claim 1, wherein said electrodes are composed of one of a rod shaped electrode and one of a cylindrically shaped hollow electrode of a thickness essentially equal to the width of the rod shaped electrode, and the electrodes are in relative rotational motion edgewise one with respect to the other.

18. The apparatus according to claim 1, wherein the electrodes have a hollow cylindrical shape and are in relative rotation edgewise one with respect to the other.

19. The apparatus according to claim 1, wherein said liquid is flown through said arc in a direction perpendicular to the direction of the arc itself.

20. The apparatus according to claim 1, wherein said liquid is flown in a direction parallel to the direction of the arc itself.

21. The apparatus according to claim 1, wherein said liquid is flown through the arc by passing inside a cylindrically shaped hollow electrode.

22. The apparatus according to claim 1, wherein at least one of the pair of electrodes is stackable and includes means for the reloading of said at least one of the pair of electrodes resulting in continuous use of said apparatus.

23. The apparatus according to claim 1, wherein said liquid is antifreeze.

24. The apparatus according to claim 1, wherein said liquid is waste oil or crude oil.

25. The apparatus according to claim 1, wherein said liquid comprises one of household, industrial, agricultural and municipal liquid waste and any of their combinations.

26. The apparatus according to claim 1, wherein said liquid is one of water and sea water.

27. The apparatus according to claim 1, wherein said liquid is one of household, municipal and industrial liquid sewage and any combination thereof.

28. The apparatus according to claim 27, further comprising means for the removal of liquid sewage from said reactor chamber following its passage through said arc.

29. The apparatus according to claim 27, wherein said flow of said liquid sewage directly through said arc causes the elimination of bacteriological forms in said liquid sewage.

30. The apparatus according to claim 27, further comprising means for the removal of the electric and magnetic polarizations acquired by said liquid sewage when it flows directly through said arc.

31. The apparatus according to claim 27, further comprising a centrifuge for removing solids in suspension in said liquid sewage after having been flown through said arc.

32. The apparatus according to claim 31, further comprising filtering means located downstream of the means for the removal of the solids in suspension in said liquid sewage.

33. The apparatus according to claim 1, wherein the means for circulating said liquid further comprises:
  means for producing magnetic fields used to increase the magnetic polarization of the gas and of the liquid, said means for producing magnetic fields being located downstream of the flowing of the liquid through said arc.

34. The apparatus according to claim 1, wherein the means for recovering from said enclosed chanter the combustible gas includes:
a storage container in fluid communication with the inlet through which the gas from the chamber is recovered.

35. A method for producing a clean burning combustible gas comprising:
providing an enclosed pressure resistant reactor chamber housing a pair of electrodes and being substantially filled with a liquid;
providing an electric power supply for generating an underliquid arc between said pair of electrodes in said enclosed chamber;
providing means for initiating, maintaining and optimizing said arc;
providing means for continuously circulating and concentrating a flow of said liquid directly through said arc between said pair of electrodes; and
providing means for recovering from said enclosed chamber a combustible gas produced by said underliquid arc, wherein an inlet to said means for recovering said gas is located above a top surface of said liquid so as to collect the gas as it bubbles to the top of the liquid;
energizing the pair of electrodes and circulating and directing the flow of said liquid through the arc so that the plasma created by the arc is moved away from the arc;
controlling a gap between said electrode for the initiation, maintenance and optimization of the arc; and
recovering the produced gas,
wherein said arc decomposes the molecules of said liquid resulting in a plasma of atoms and their combinations exposed to intense electric and magnetic fields existing at atomic distances from said arc,
wherein said flow of said liquid directly through said arc continuously removes said plasma from said arc,
wherein following said removal of said plasma from the arc, said plasma cools down in said liquid resulting in a clean burning combustible gas,
wherein said flow of the liquid through said arc minimizes the recombination of hydrogen and oxygen into water caused by the arc itself thereby increasing the efficiency of said apparatus,
wherein said flow of the liquid through said arc minimizes the oxidation of carbon monoxide into carbon dioxide caused by the arc itself thereby increasing the efficiency of said apparatus and improving the environmental properties of said gas,
wherein the flow of said liquid through said arc cools the electrodes thereby increasing the useful life of the electrodes,
wherein said flow of said liquid through the arc exposes said liquid to intense electric and magnetic fields existing at atomic distances from the arc.

36. The method according to claim 35, wherein said gas is detectable by the presence of peaks when analyzed with mass spectrometry equipment, and said peaks have no infrared signature other than the infrared signature of their constitutents.

37. The method according to claim 35, wherein said liquid which has been exposed to the arc is detectable by the presence of peaks when analyzed with mass spectrometry equipment, and said peaks have no ultraviolet signature other than the ultraviolet signature of their constitutents.

38. The method according to claim 35, wherein the combustion exhaust of said combustible gas is rich in breathable oxygen originating from said liquid, said oxygen being suitable to replenish atmospheric oxygen depleted by fossil fuel combustion.

39. The method according to claim 35, wherein the combustion exhaust of said gas contains no toxic substance.

40. The method according to claim 36, wherein the flow of said liquid directly through said arc permits the increase of substances in solution and suspension in said liquid.

41. The method according to claim 40, wherein the increased substance in suspension is coal that is decomposed by said arc.

42. The method according to claim 36, wherein said electrodes are made of nonconsumable conducting material, resulting in a combustible gas solely composed of the elements of said liquid.

43. The method according to claim 42, wherein said liquid is water, resulting in a combustible gas comprising hydrogen and oxygen.

44. The method according to claim 36, wherein said power supply produces a continuous DC current.

45. The method according to claim 36, wherein said power supply produces a DC pulse.

46. The method according to claim 36, wherein the power supply produces alternating current.

47. The method according to claim 36, wherein the power supply produces alternating current with a frequency optimized for increasing the rate of separation of the liquid molecules.

48. The method according to claim 36, wherein the electric arc occurs between an electrode composed of a non-consuming conductor material, and another electrode composed of a consumable carbon base material.

49. The method according to claim 36, wherein the electric arc occurs between electrodes composed of a consumable carbon base material.

50. The method according to claim 36, wherein the electric arc occurs between rod shaped electrodes.

51. The method according to claim 36, wherein said electrodes are composed of one of a rod shaped electrode and one of a cylindrically shaped hollow electrode of a thickness essentially equal to the width of the rod shaped electrode, and the electrodes are in relative rotational motion edgewise one with respect to the other.

52. The method according to claim 36, wherein the electrodes have a hollow cylindrical shape and are in relative rotation edgewise one with respect to the other.

53. The method according to claim 36, wherein said liquid is flown through said arc in a direction perpendicular to the direction of the arc itself.

54. The method according to claim 36, wherein said liquid is flown in a direction parallel to the direction of the arc itself.

55. The method according to claim 36, wherein said liquid is flown through the arc by passing inside a cylindrically shaped hollow electrode.

56. The method according to claim 36, wherein at least one of the pair of electrodes is stackable and includes means for the reloading of said at least one of the pair of electrodes resulting in continuous use of said apparatus.

57. The method according to claim 36, wherein said liquid is antifreeze.

58. The method according to claim 36, wherein said liquid is waste oil or crude oil.

59. The method according to claim 36, wherein said liquid comprises one of household, industrial, agricultural and municipal liquid waste and any of their combinations.

60. The method according to claim 36, wherein said liquid is one of water and sea water.

61. The method according to claim 36, wherein said liquid is one of household, municipal and industrial liquid sewage and any combination thereof.

62. The method according to claim 61, further comprising:
   providing means for the removal of liquid sewage from said reactor chamber following its passage through said arc; and
   removing said liquid sewage from said chamber following its passage though the arc.

63. The method according to claim 61, wherein said flow of said liquid sewage directly though said arc causes the elimination of bacteriological forms in said liquid sewage.

64. The method according to claim 62, further comprising:
   providing means for the removal of the electric and magnetic polarizations acquired by said liquid sewage when it flows directly through said arc; and
   directing said liquid sewage after it is flown through said arc into said means for the removal of the electric and magnetic polarizations acquired by said liquid sewage.

65. The method according to claim 64, further comprising:
   providing a centrifuge for removing solids in suspension in said liquid sewage after having been flown through said arc; and
   directing said liquid sewage exiting the means for the removal of the electric and magnetic polarizations acquired by said liquid sewage into the centrifuge and removing said solids in suspension in said liquid sewage.

66. The method according to claim 65, further comprising:
   providing means for filtering, said means for filtering being located downstream of the means for the removal of the solids in suspension in said liquid sewage; and
   directing the liquid sewage processed through the means for the removal of the electric and magnetic polarizations acquired by said liquid sewage and the centrifuge through the means for filtering to produce water suitable for irrigation.

67. The method according to claim 36, wherein the means for circulating said liquid further comprises:
   providing means for producing magnetic fields used to increase the magnetic polarization of the gas and of the liquid, said means for producing magnetic fields being located downstream of the flowing of the liquid trough said arc.

68. The method according to claim 36, wherein the means for recovering from said enclosed chamber the combustible gas includes:
   a storage container in fluid communication with the inlet through which the gas from the chamber is recovered.

* * * * *